United States Patent
Yajima

(10) Patent No.: US 6,681,372 B2
(45) Date of Patent: Jan. 20, 2004

(54) INFORMATION PROCESSING APPARATUS AND METHOD FOR MAKING DOCUMENT

(76) Inventor: Mantaro Yajima, 521 Teraya, Saijocho, Higashihiroshima-shi, Hiroshima-ken (JP)

( * ) Notice: Subject to any disclaimer, the term of this patent is extended or adjusted under 35 U.S.C. 154(b) by 0 days.

(21) Appl. No.: 09/429,168

(22) Filed: Oct. 28, 1999

(65) Prior Publication Data

US 2002/0095444 A1 Jul. 18, 2002

Related U.S. Application Data

(63) Continuation of application No. 08/747,399, filed on Nov. 12, 1996, now abandoned.

(30) Foreign Application Priority Data

Nov. 10, 1995 (JP) .............................. 7-317319

(51) Int. Cl.[7] .............................................. G06F 15/00
(52) U.S. Cl. ..................... 715/541; 715/530; 382/186; 382/187; 382/188
(58) Field of Search ................. 707/517, 530, 707/541, 528; 345/352, 358; 382/182, 187, 188, 186, 181; 715/541, 530, 517, 528

(56) References Cited

U.S. PATENT DOCUMENTS

| | | | |
|---|---|---|---|
| 4,162,482 A | 7/1979 | Su | 382/202 |
| 4,553,261 A | 11/1985 | Froessl | 382/306 |
| 4,748,687 A | 5/1988 | Auracher et al. | 359/180 |
| 4,972,496 A | 11/1990 | Sklarew | 382/187 |
| 5,220,649 A | 6/1993 | Forcier | 707/541 |
| 5,231,698 A | 7/1993 | Forcier | 707/541 |
| 5,287,417 A | 2/1994 | Eller et al. | 382/276 |
| 5,590,257 A | 12/1996 | Forcier | 707/530 |
| 5,655,136 A * | 8/1997 | Morgan | 382/187 |
| 5,666,139 A | 9/1997 | Thielens et al. | 345/173 |
| 5,781,662 A * | 7/1998 | Mori et al. | 382/189 |
| 5,798,758 A * | 8/1998 | Harada et al. | 345/339 |
| 5,809,267 A * | 9/1998 | Moran et al. | 345/358 |
| 5,848,187 A * | 12/1998 | Bricklin et al. | 382/187 |
| 5,880,743 A * | 3/1999 | Moran et al. | 345/473 |
| 5,913,221 A * | 6/1999 | Kano et al. | 707/530 |
| 5,966,127 A * | 10/1999 | Yajima | 345/352 |

OTHER PUBLICATIONS

Wordperfect Corporation, Wordperfect for DOS, 560, 561, 689, 266 (1989).

* cited by examiner

Primary Examiner—Stephen S. Hong
Assistant Examiner—Thu V. Huynh
(74) Attorney, Agent, or Firm—Wenderoth, Lind & Ponack, L.L.P.

(57) ABSTRACT

An information processing apparatus and method capable of making a desired document using a simple operation based on highly object oriented features. In an embodiment, all writings in a source document are entered by an image scanner and decomposed into individual characters (character strings), symbols and/or graphicals. From them a recognize characters and graphicals block makes document element records which are stored into a document element file storage. A create descriptor elements block makes descriptor element records of document-carried written signs for descriptors for specifying requirements of a desired document from the document element records while referencing descriptor group attributes and descriptor element specifiers. A create descriptors block makes descriptor records from the descriptor element records in a first storage and the document element records in a second storage while looking up the descriptor element specifiers.

28 Claims, 47 Drawing Sheets

FIG. 2

[ MODE LIST ]

(MAIN MODES)　　　(SUB MODES)

- CREATE DOCUMENT
  - RECOGNIZE CHARACTERS & GRAPHICALS
  - EXECUTE FORMAT AND EDIT
  - PRINT
  - SAVE
  - LOAD
  ⋮
- DEFINE
  - SPECIFY GROUP ATTRIBUTES
  - RECOGNIZE DESCRIPTORS
  - RECOGNIZE ASSOCIATION
  ⋮
- CONFIGURE SYSTEM
  - SET WRITTEN SIGNS FOR DESCRIPTORS
  ⋮
- OUTPUT DATA
  - EXECUTE OUTPUT

[ MAIN MODE MENU SCREEN ]

FIG. 5

[DESCRIPTORS / WRITTEN SIGNS] PART 1

| DESCRIPTOR GROUP | DESCRIPTOR ELEMENT | WRITTEN BY |
|---|---|---|
| COMMON | LINK | ─── |
| | DICTIONARY SEARCH | ⬭ , ▨ |
| | ⋮ | ⋮ |
| MANAGE DOCUMENT | DATA ITEM | < > , ▨ |
| | DOCUMENT TITLE | |
| | FIELD | ▭ , ▨ |
| | SORT | |
| | INCREASING | ↑ |
| | DECREASING | ↓ |
| | EFECTIVE FIGURES | NUMERIL FIGURES |
| | ROUNDING | ROUND UP |
| | | ROUND DOWN |
| | | ROUND OFF |

FIG. 6

[DESCRIPTORS/WRITTEN SIGNS] PART 2

| DESCRIPTOR GROUP | DESCRIPTOR ELEMENT | WRITTEN BY |
|---|---|---|
| FORMAT DOCUMENT | OBJECT | >  <, ///// |
| | OBJECT | ▭ , \\\\\\ |
| | CENTERING | C, CENTERING * |
| | RIGHT JUSTIFICATION | R, RJ, JUSTIFY, → |
| | TAB | ▽ |
| | MARGIN | ]   [ |
| | . | . |
| | . | . |
| EDIT DOCUMENT | OBJECT | >  <, ///// |
| | OBJECT | ▭ , \\\\\\ |
| | DELETE | = |
| | INSERT | V |
| | MOVE | ⌒→ |
| | COPY | ○⌒→ |
| | . | . |
| | . | . |

FIG. 8

SALES LEDGER  KANDA BRANCH
1995 YEAR

| ARTICLE | | QUANTITY | PRICE (¥) | SALES (K¥) | |
|---|---|---|---|---|---|
| | | | | | |
| | | | | | |
| | | | | | |
| | | | | | |
| | | | | | |
| | | | | | |
| | | Σ | | Σ | |

SALES = PRICE × QUANTITY

[CHARACTER RECORD]

[ DESCRIPTOR ELEMENT RECORD ]

GROUP CODE

DESCRIPTOR ELEMENT CODE

POINTERS TO DOCUMENT ELEMENT RECORDS

END

FIG. 28

[ APPLICATION DICTIONARY ]

| ENTRY GROUP | ENTRIES |
|---|---|
| UNIT | km, m, cm, mm <br> M UNITS, K UNITS <br> M YENS, M¥, K YENS, K¥, YEN, ¥, ··· <br> M DOLLARS, M$, K DOLLARS, K$, <br> DOLLAR, $, ··· |
| ARITHMETIC | =, ×, +, ÷, ··· |
| SUM | Σ, SUM, TOTAL, GROSS, ··· |

[ DICTIONARY ENTRY ]

[ARITHMETIC DESCRIPTOR RECORD]

[ DOMAIN DESCRIPTOR RECORD ]

[ LAYOUT DESCRIPTOR RECORD ]

FIG. 43

SALES

KANDA BRANCH
1995 YEAR

| ARTICLE | QUANTITY | PRICE (*) | SALES (K*) |  |
|---------|----------|-----------|------------|--|
|         |          |           |            |  |
|         |          |           |            |  |
|         |          |           |            |  |
|         |          |           |            |  |
|         |          |           |            |  |
|         | Σ        |           | Σ          |  |
|         |          |           |            |  |

SALES = PRICE × QUANTITY

FIG. 46

[ HEADER OF SOURCE DATA FILE ]

| DATA ITEM | BUN | HIN | TAN | SUU | MON | MAK |
|---|---|---|---|---|---|---|
| FIELD LENGTH (BYTE) | 20 | 20 | 5 | 5 | 5 | 20 |
| NUMERIC/CHARACTER | 0 | 0 | 1 | 1 | 1 | 0 |

[ SOURCE DATA FILE ]

| RADIO | 05030 | . . . . . . . . . . . |
|---|---|---|
| BUN | HIN | |

FIG. 47

[ DATA ITEM TRANSLATOR TABLE ]

| SALES SLIP | SALES FILE | SALES |
|---|---|---|
| GROUP | BUN | GROUP |
| PRODUCT CODE | HIN | PRODUCT CODE |
| PRICE | TAN | PRICE |
| QUANTITY | SUU | QUANTITY |
| — | — | SALES |
| MONTH | MON | MONTH |

FIG. 52

SALES KANDA BRANCH 1995 YEAR

| ARTICLE | | QUANTITY | PRICE (¥) | SALES (K¥) | | | | | |
|---|---|---|---|---|---|---|---|---|---|
| TV | J1020 | 396 | 73200 | 28987 | | | | | |
| RADIO | V5030 | 1132 | 23600 | 26715 | | | | | |
| TV | J1010 | 504 | 52100 | 26259 | | | | | |
| . | . | . | . | . | | | | | |
| . | . | . | . | . | | | | | |
| . | . | . | . | . | | | | | |
| | | Σ 7835 | | Σ 254360 | | | | | |

SALES = PRICE × QUANTITY

FIG. 53

SALES
KANDA BRANCH
1995YEAR

ARTICLE | QUANTITY | PRICE (¥) | SALES (K¥)

90 — QUANTITY
92 — (hatched area)
20a
94 — 1.FIELD 2.DATA ITEM 3.UNIT 4.SUM 5.ARITHMETIC

Σ

< DEFINE >

MENU
MODE

FIG. 54

| [ GROUP ] | [ COLOR ] | [ LINE TYPE ] | [ LINE WIDTH ] | [ HANDWRITTEN / PRINTED ] |
|---|---|---|---|---|
| MANAGE DOCUMENT | | | | |
| FORMAT DOCUMENT | | SOLID | BOLD | |
| EDIT DOCUMENT | | DOTTED | LIGHT | |
| DECLARE FILE | | | | |
| DECLARE FLOW CHART | | | LIGHT | |
| DECLARE GRAPH | | | | |

| MENU | |
|---|---|
| MODE | 〈 DEFINE 〉 |

RECOGNIZE DESCRIPTORS  RECOGNIZE ASSOCIATION

[ SPECIFY DESCRIPTOR GROUP ATTRIBUTES ]

20a

INFORMATION PROCESSING APPARATUS AND METHOD FOR MAKING DOCUMENT

This is a continuation application of Ser. No. 08/747,399, filed Nov. 12, 1996, now abandoned.

BACKGROUND OF THE INVENTION

The invention relates to information processing apparatus for processing document and/or data.

Information processing apparatus (computer-based system) for processing business have been wildly used. Traditionally, to make an electronic document such as slip, ledger, or journal, all format particulars of a document must be coded on a coding sheet according to a programming language such as COBOL. This method requires, however, familiarity with the coding programming language on the part of a user and involves complicated coding procedures with low flexibility of formatting.

More recent information processing apparatus with advanced semi conductor devices are object-oriented. They incorporate a user friendly architecture and software, and make an electronic document primarily based on a display-driven system.

Some of the recent information processing apparatus receive ruled lines and/or character strings entered by keyboard and mouse operation on a display screen. The entered data are regarded as specifying format requirements of a document to be made. Thus, the apparatus formats an electronic document according to the entered data.

In some information processing apparatus, an input equipment such as mouse is operated to enter rule lines into a screen and select a desired field and domain. Then, a display window presenting a list of attributes or items associated with the designated field appears on the screen. A desired item in the list is selected to specify a format requirement of that field.

Such prior art information apparatus for processing a document still requires a complicated procedure and a voluminous manual to be learned by users, yet limited in flexibility of variably specifying format requirements. In addition, the entered information pieces on the screen are all regarded as specifying format particulars of a document to be made. Therefore, the prior art document information processing apparatus have the disadvantages in several respects. For example, information pieces not related with the document format, such as command, branch name, telephone number etc., cannot be entered as document contents. A considerable amount of time is consumed to specify format particulars of document to be made since it involves a sequential invoking of windows on the screen. The entire format requirements of a document cannot be confirmed at once.

SUMMARY OF THE INVENTION

In view of the above problems, an object of the invention is to improve object-oriented features and to provide an information processing apparatus and method capable of making a desired document based on simplified operation by a user.

Another object of the invention is to provide an information processing apparatus and method capable of making a desired document by entering characters, symbols and/or graphicals into a document.

A further object of the invention is to provide a document information processing apparatus and method capable of entering document contents as well as format particulars thereof.

A further object of the invention is to provide a document information processing apparatus and method capable of entering data-managing as well as document formatting requirements.

A yet further object of the invention is to provide a document information processing apparatus and method capable of confirming input requirements of a document at once.

In accordance with an aspect of the invention, there is provided an information processing apparatus in which written signs in the form of characters, symbols and/or graphicals written in a document are entered as descriptors for specifying format requirements of a document to be made. According to the descriptors, the desired document is formatted. In another mode of the invention, written signs in the form of characters, symbols and/or graphicals written in a document are entered as descriptors for specifying desired document data management requirements. According to the descriptors, a desired document is formatted and data-managed.

The descriptors of the invention comprise descriptor-dedicated written signs for dedicately constructing descriptors. The descriptor-dedicated written signs are qualified with predetermined attributes which are distinct from those of ordinary writings representative of document contents. The descriptor-dedicated written signs may directly be written within an area or domain having an object of descriptors. The descriptors may also include those ordinary written items which are designated in a predetermined manner. Such ordinary written items may be signed by predetermined descriptor-designated written signs. The written sign entering device uses a common input system to enter the ordinary writings representative of document contents and descriptors for specifying document requirements as an image or from a display screen.

The descriptor recognizing device recognizes from written signs entered by the written-sign entering device descriptors that specify a desired document format and document data managing. The descriptor recognizing device recognizes from an entered image of document writings descriptor-dedicated written signs having predetermined attributes. The descriptor recognizing device may recognize from descriptor-dedicated written signs, those marks having predetermined characters, symbols and/or graphicals as descriptor elements. From the entered information, the descriptor recognizing device may identify ordinary written items representative of document contents and determine ordinary written signs as predetermined descriptors when they are designated by predetermined descriptor element written signs. From the entered information, characters and graphicals are recognized for all descriptor-dedicated written signs and those ordinary written signs associated therewith only. As a result of the recognition, document element records are created for respective descriptor-dedicated written signs and associated ordinary written items.

The descriptor recognizing device executes commands of edit-document descriptors, the object of which is specified by an already entered ordinary written item or descriptor-dedicated written sign. As a result, the ordinary sign and/or descriptor-dedicated written sign is changed, moved, copied or deleted. The descriptor recognizing device may be responsive to a command of requesting for classifying an already entered written sign into either an ordinary written item or descriptor-dedicated written sign to execute the command to thereby classify the written sign into either an ordinary written item or descriptor-dedicate written sign. As a result of the execution, the ordinary written item or descriptor-dedicate written sign is changed, moved, copied or deleted.

The formatting device formats a desired document, or data manages and formats a desired document according to the descriptors recognized by the descriptor recognizing device.

The formatting device may first execute those descriptors pertaining to an edit-document group to edit-process written signs in the document and then execute those descriptors pertaining to a format-document group to specify a format of written signs in the document.

In accordance with the invention, written signs in the form of characters, symbols and/or graphicals additionally written in a document are entered to specify desired descriptors which are then utilized to make a desired document. Such written signs may be very familiar to users so that users can easily make a desired document with a simple operation. If desired, already-entered ordinary written items can be converted into written signs for desired descriptors, thus facilitating document making with high efficiency.

Using the edit-document feature, already-entered descriptors can freely be changed, moved, copied and/or deleted, thus providing great flexibility of document making with high efficiency.

BRIEF DESCRIPTION OF THE DRAWINGS

FIG. 2 is a diagram showing a list of operation modes of making documents in accordance with the embodiment system;

FIG. 5 shows a table of relation between descriptor elements and written signs in accordance with the embodiment system;

FIG. 6 shows a table of relation between descriptor elements and written signs in accordance the embodiment system;

FIG. 8 shows a source document sheet on which written signs for descriptors will be entered later in accordance with the embodiment system;

FIG. 28 schematically shows an application dictionary in which term entries are illustrated in accordance with the embodiment system;

FIG. 43 is a view of a display screen on which a document is presented as a result of executing format-document and edit-document descriptors in accordance with the embodiment system;

FIG. 46 illustrates a source data file together with a header thereof in accordance with the embodiment system;

FIG. 47 shows a data item translation table in accordance with the embodiment system;

FIG. 52 illustrates an output document in accordance with the embodiment system;

FIG. 53 illustrates how input commands are used to specify descriptors in accordance with the embodiment system; and FIG. 54 is a view of a specify descriptor group attributes screen in accordance with the embodiment system.

DETAILED DESCRIPTION OF PREFERRED EMBODIMENT

The invention will now be described in more detail with respect to an embodiment thereof taken in conjunction with the accompanying drawings.

Figure 1:
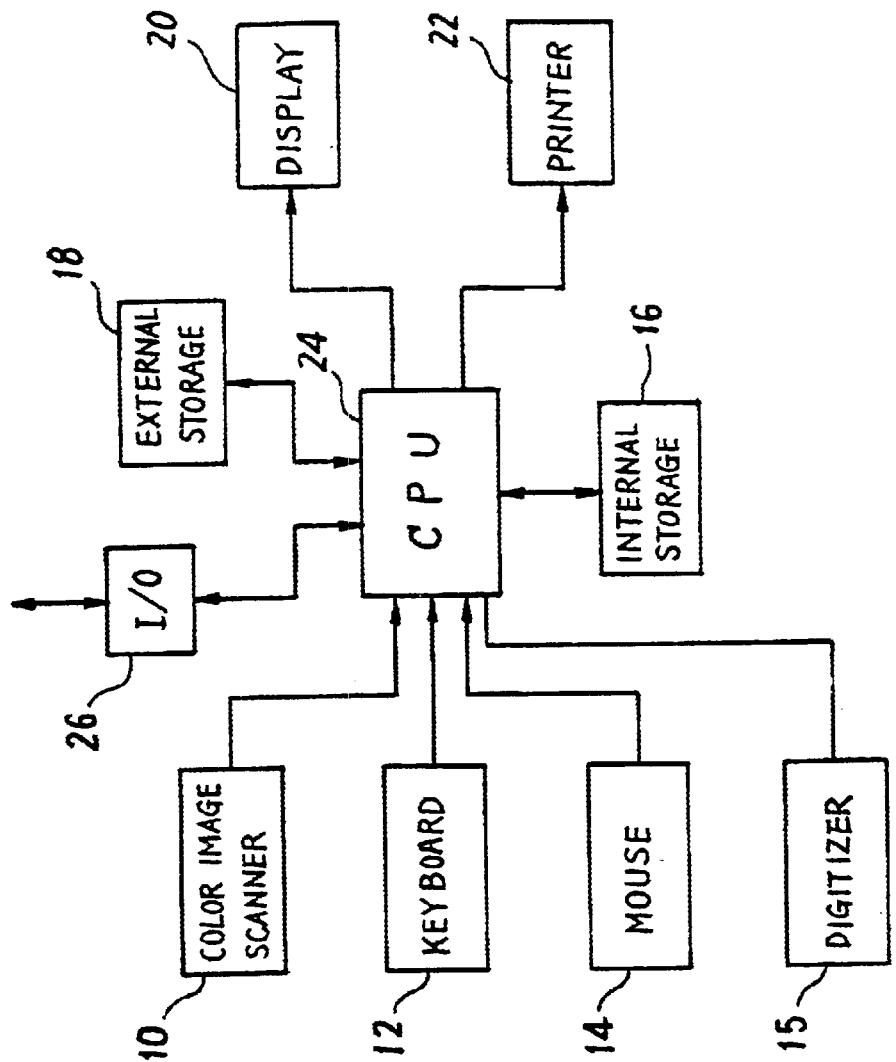
FIG. 1 is a block diagram showing a hardware organization of one embodiment of an information processing apparatus in accordance with the invention.

FIG. 1 shows a hardware organization of one embodiment of a information processing apparatus or system in accordance with the invention. In the embodiment system, a color image scanner 10, keyboard 12, mouse 14 and digitizer 15 each serves as an input equipment. An internal storage 16 and external storage 18 each serves as a storage system. A display 20 and printer 22 each serves as an output device. The respective components are connected to CPU 24 via associated interface circuits (not shown). CPU 24 is also connected to an external system (not shown) via a communication interface I/O 26.

The color image scanner 10 is used to read a source document sheet carrying characters, symbols and/or graphicals thereon as a colored image. The internal storage 16 and external storage 18 store electronic dictionaries, character fonts etc., as well as programs for controlling CPU 24.

FIG. 2 shows a list of modes of operation in which the embodiment system makes a document. Main modes are "CREATE DOCUMENT", "DEFINE", "CONFIGURE SYSTEM", "OUTPUT DATA" etc. Each main mode of "CREATE DOCUMENT", "DEFINE", "CONFIGURE SYSTEM" is subdivided into submodes of "RECOGNIZE CHARACTERS AND GRAPHICALS" etc., "SPECIFY GROUP ATTRIBUTES" etc., "SET WRITTEN SIGNS FOR DESCRIPTORS", etc. respectively.

Figure 3:
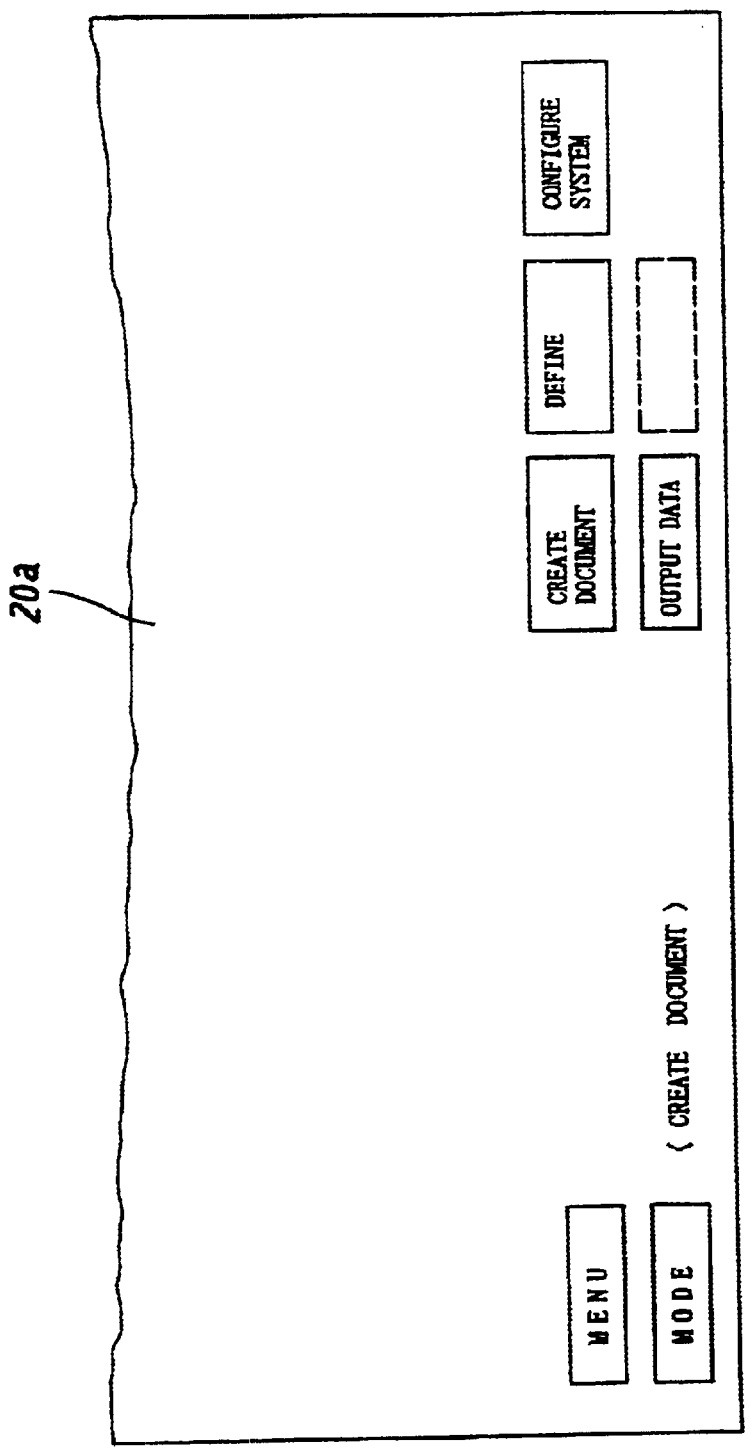
FIG. 3 is a view of a main mode menu screen in accordance with the embodiment system.

FIG. 3 depicts "main mode menu screen" presented on a display screen 20a of the display 20. The "MAIN MODE MENU SCREEN" is invoked when the "MODE" button or icon (which is always presented at bottom left of the display screen 20a) is selected or clicked. The "MAIN MODE MENU SCREEN" presents main mode select buttons of "CREATE DOCUMENT", "DEFINE", "CONFIGURE SYSTEM" and "OUTPUT DATA" at bottom right of screen 20a.

Figure 4:
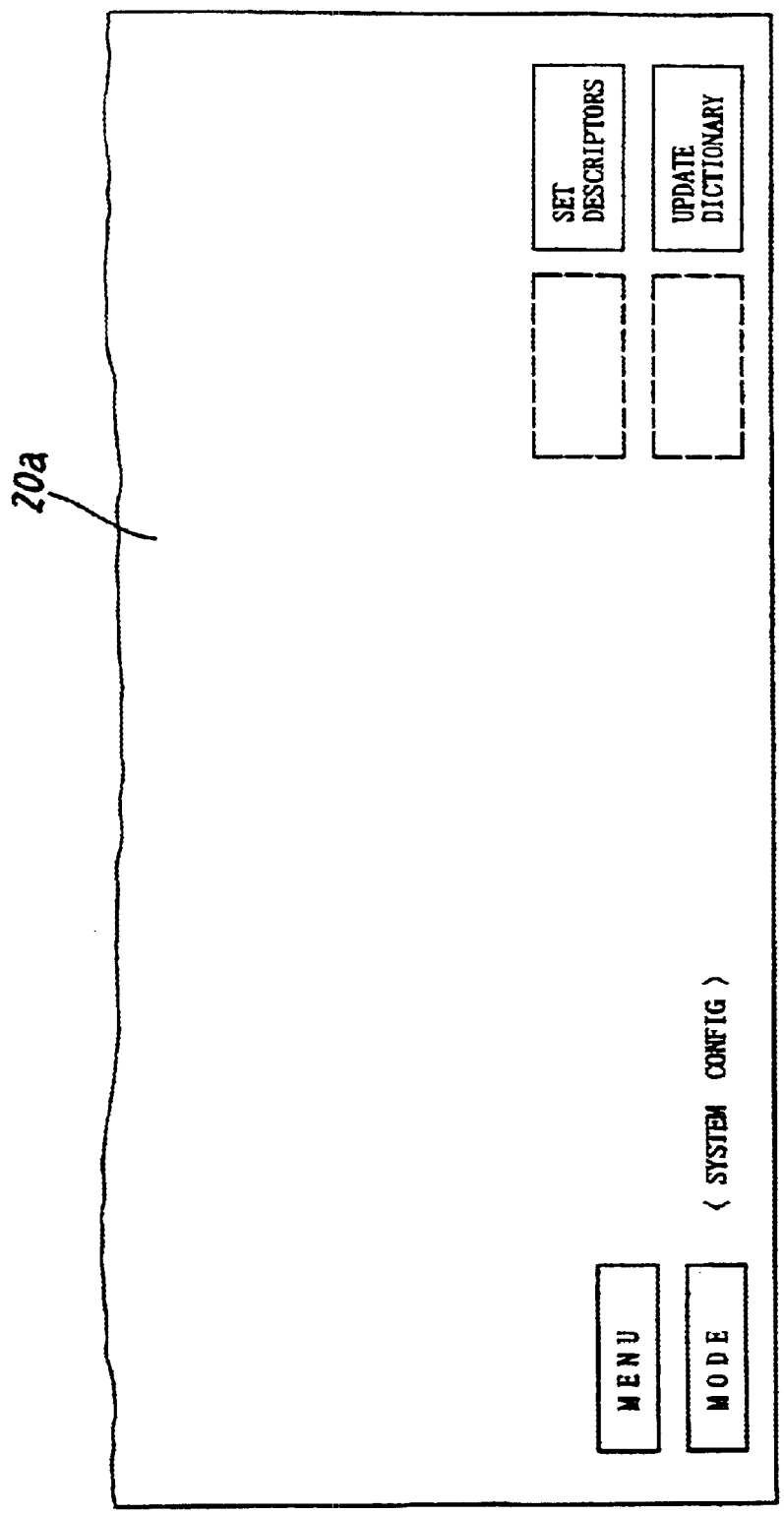
FIG. 4 is a view of a configure system mode screen in accordance with the embodiment system.

When the "CONFIGURE SYSTEM" button is clicked from the "MAIN MODE MENU SCREEN", the system enters a configure system mode, presenting "CONFIGURE SYSTEM MODE SCREEN" shown in FIG. 4 on the display screen 20a. There appear submode select buttons of "SET DESCRIPTORS", "UPDATE DICTIONARY", etc., at bottom right of the display screen. If the "SET DESCRIPTORS "button is clicked here, the system enters a set descriptors mode, presenting on the screen a table of relation between descriptor elements and written signs, such as the one shown in FIGS. 5 and 6.

In FIGS. 5 and 6, the embodiment employs a plurality of different descriptor groups such as "COMMON", "MANAGE DOCUMENT", "FORMAT DOCUMENT", "EDIT DOCUMENT" etc. Each descriptor group contains plurality of descriptor elements. Descriptor elements pertaining to the "MANAGE DOCUMENT" group are used to specify required data-managing of a document. Descriptors pertaining to "FORMAT DOCUMENT" and "EDIT DOCUMENT" are used to specify a required document format. Those descriptors pertaining to "COMMON" group are used in common to data-manage document and format document.

As shown in FIGS. 5 and 6, each descriptor element is defined by a written sign in the form of character or characters string (character), symbol(s) and/or graphical(s). Some descriptor elements, such as "ROUND UP" pertaining to the "MANAGE DOCUMENT" group, directly specify objects. Some other descriptor elements (such as the descriptor element of "DATA ITEM" pertaining to the "MANAGE DOCUMENT" group and corresponding to a written sign of" < >") mark or designate another written sign or item as an object (e.g., data item) thereof. Still other descriptor elements, for example, the descriptor element of "DICTIONARY SEARCH" pertaining to the "COMMON" group and defined by a written sign of "○" is used to request dictionary search for a predetermined written item of character(s) and/or symbol (e.g., arithmetic formula symbol, unit name) located in the written sign of "○" for specifying descriptor content.

Figure 7:
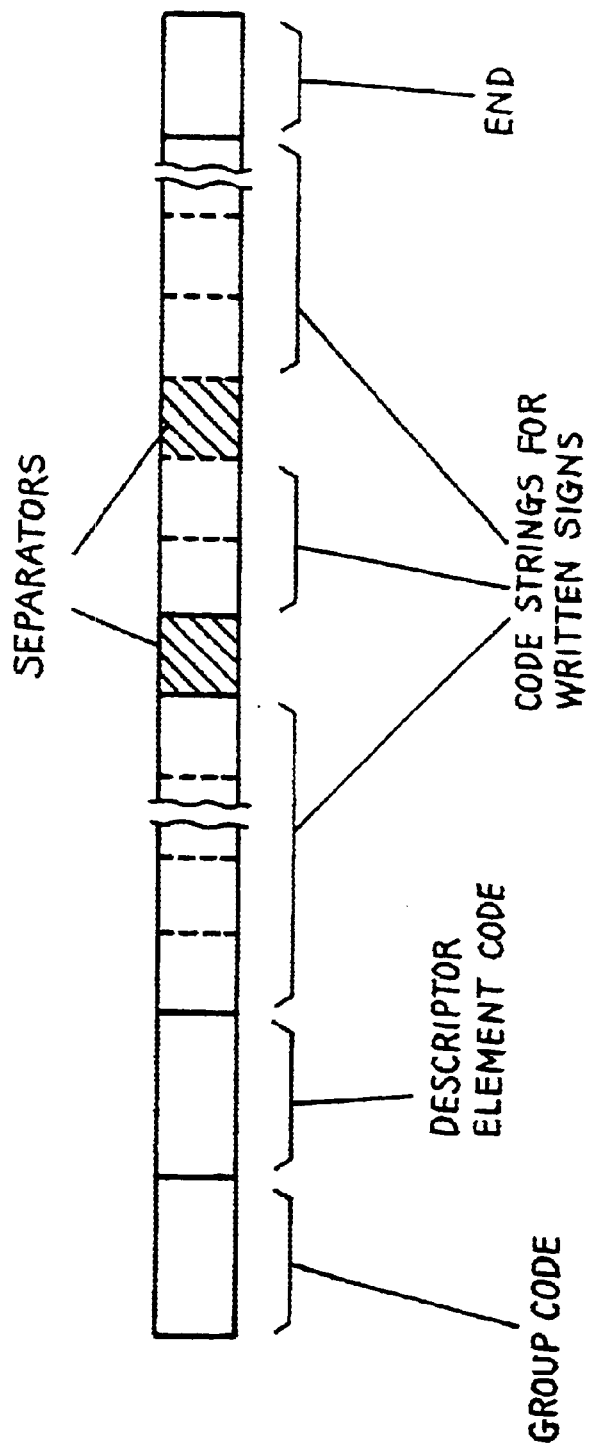
FIG. 7 is a format of a descriptor specifier in accordance with the embodiment system.

The relation between descriptors and written signs may be preset in the system. In the alternative it may be user-programmable in a display-driven system. In either case, for implementation of the descriptors-to-written signs table shown in FIGS. 5 and 6, descriptor element specifiers having a variable length format shown in FIG. 7 are used. A set of descriptor element specifiers are stored in descriptor specifier file storage 48 (FIG. 23) as will be described in connection with "RECOGNIZE DESCRIPTORS."

As shown in FIG. 7, each descriptor element specifier record has a group code field indicative of a descriptor group code of, say, "MANAGE DOCUMENT" to which a descriptor element of, say, "RIGHT JUSTIFICATION" pertains, a descriptor element code field indicative of the descriptor element code (right justification code), written sign data field indicative of a corresponding written sign of character (character string) or symbols (e.g., "R", "RJ", "JUSTIFY", "→") with separator codes and the last field indicative of the end of the record.

In accordance with the embodiment, descriptor elements for document definition are indicated and specified by written signs in the form of characters, symbols and/or graphicals. Such written signs may also be used as ordinary written item representative of document contents. When written signs are used for descriptor elements, they are qualified with a special attribute (by color, for example) to distinguish from ordinary written items representative of document contents. In doing so, a user can use familiar written signs or symbols as ordinary written items representative of document contents or as marks for descriptors by qualifying them with unique attributes.

A make document feature of the present system will now be described.

FIG. 8 shows a source document sheet on which basic items of sales ledger for a sales accounting system have been hand-written. All written items in the form of characters, symbols and/or graphicals are ordinary written items or writings representative of document contents. They are written in common color, for example, in black.

Figure 9:
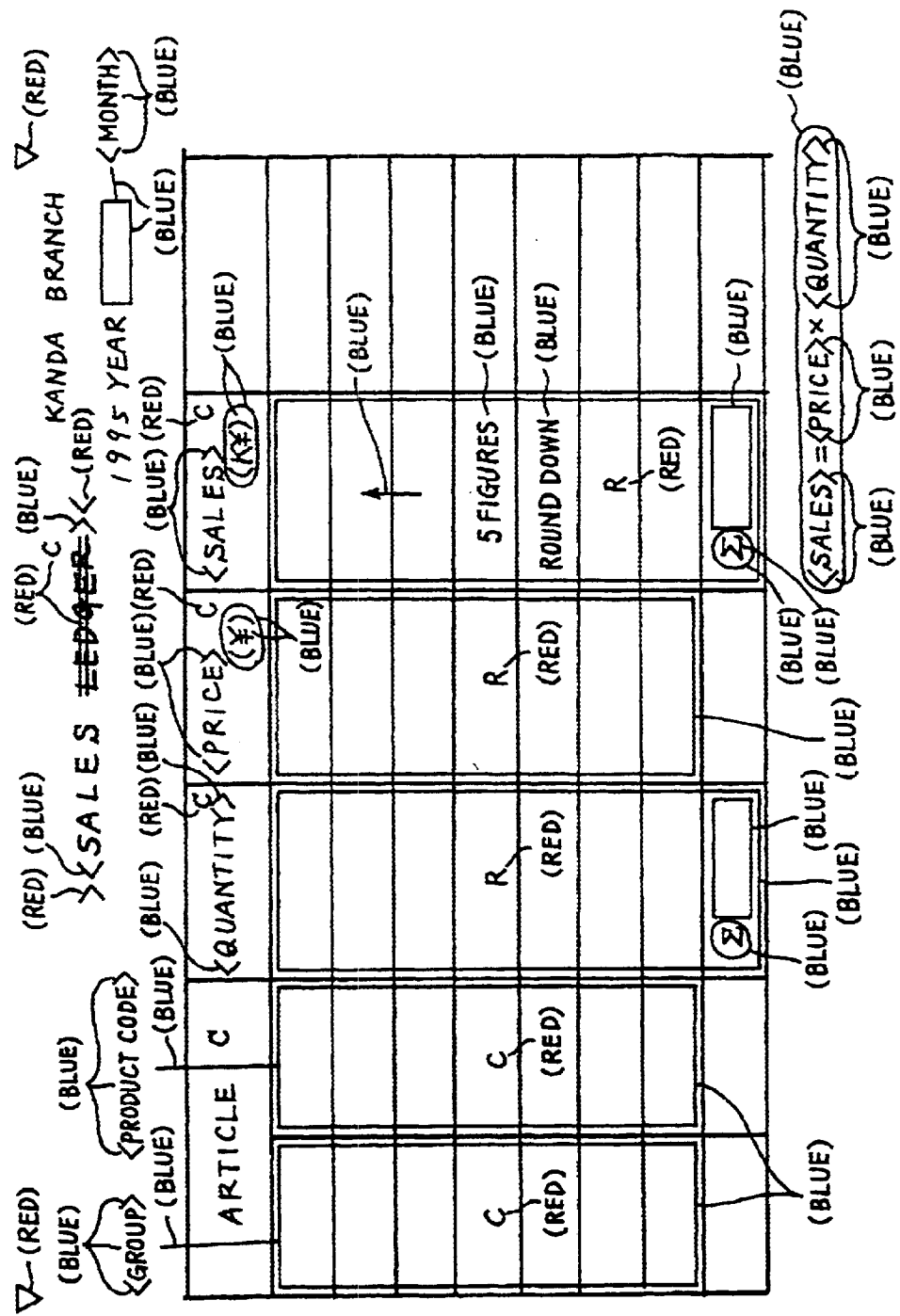
FIG. 9 shows a source document sheet on which written signs for descriptors have been entered in accordance with the embodiment system.

Then, using a color writing instrument, a user may write in the source document sheet those written signs for descriptors of data-managing and formatting document, according to the relation between descriptor elements and written signs (FIGS. 5 and 6). A resultant source document sheet is shown in FIG. 9.

Special colors are used to qualify additional written signs for descriptor elements according to their group. For example, additional written signs for descriptor elements pertaining to the "MANAGE DOCUMENT" group are entered in blue whereas additional written signs for descriptor elements pertaining to the "FORMAT DOCUMENT" and "EDIT DOCUMENT" groups are entered in red.

In the source document shown in FIG. 9, blue colored written signs for "MANAGE DOCUMENT" descriptors are as follows. A black-colored ordinary written item "1995 year" is located at document of right. Entered right next to it is a blue colored written sign "□" which indicates a field. The field mark "□" is connected via a link-indicative blue colored written sign "-" to a blue colored written signs "< >" that designate "DATA ITEM." A blue colored character string of "MONTH" is filled in between the data item designating marks "< >" as "<MONTH>." The written sign combination of "□-<MONTH>" specifies a data-manage document descriptor that states within the field of the "□", data of data item name <month> is to be filled.

The character string "MONTH" within "<MONTH>" has a blue color attribute and is thus qualified as an additional written sign descriptor element which is distinguishable from a black colored character string of "MONTH" as an ordinary written item or writing.

Similarly, character strings "GROUP" and "PRODUCT CODE" in the context of blue colored written signs "<GROUP>" and "<PRODUCT CODE>" also serve for descriptor elements. These written signs "<GROUP>" and "<PRODUCT CODE>" are connected via respective links "-" to respective field marks "□" that extend along ruled lines of left and right columns below a black colored ordinary written item "ARTICLE." The written sign combinations "□<-GROUP>" and "□-<PRODUCT CODE>" each constructs a document data-managing descriptor which indicates that within the field "□", data of data item "GROUP" (or "PRODUCT CODE") are to be filled. On the right of the "ARTICLE" column, black colored ordinary writing "QUANTITY" is bracketed by a blue colored mark "< >" as "<QUANTITY>" to define the "QUANTITY" as a data item. An area below the "<QUANTITY>" is enclosed by a blue colored field mark "□". No link "-" exists for connecting the "<QUANTITY>" to the "□". In absence of link "-", the data item "< >" and the field "□" are aligned in the same column or row. In such a case, the embodiment system recognizes association or connection between them as default, as will be described in "RECOGNIZE DESCRIPTORS."

A descriptor written sign, such as the data item designating mark "< >", in the example above, may mark or designate a black colored ordinary writing, such as the "QUANTITY", to thereby qualify or define the ordinary writing "QUANTITY" as a descriptor written sign in the context of the "<QUANTITY>."

Therefore, if a user wishes to define an ordinary writing originally written or printed in the source document as a data item, he or she simply marks or brackets it by a "< >". To add a new data item, the user may simply enter the name of the new data item, such as the "GROUP" in the example above, together with a bracket mark "< >" using a blue color as a descriptor qualifier.

Entered in the tabular bottom cell included in the field "□" of "<QUANTITY>" are an ordinary writing (black) "Σ" (which is enclosed by a search-dictionary written sign (blue) "○") and a small field mark (blue) of "□" right. As in the case of the "<QUANTITY>" the original writing "Σ" is qualified as a written sign for descriptor. The combination of the "Σ" enclosed by the blue "○" with the "□" constitutes a data-managing descriptor which indicates that numeric data to be filled in the field of "QUANTITY" is to be summed and the resultant sum data is to be filled in the field "□" next to the "Σ."

As in the case of the "<QUANTITY>" column, right columns of "PRICE" and "SALES" include similar written signs "< >", "○" and "□" all entered in blue for document data-managing. In these columns, black colored ordinary writings "¥" and "K¥" are enclosed by respective "SEARCH DICTIONARY" written signs "○", thus qualifying the ordinary writings as descriptor elements. The descriptor-qualified writings "¥" and "K¥" indicate that numerical (money) data to be filled in tabular cells of the field of this data item must be expressed in unit of "yen" or "1000 yens", respectively.

Entered in the "<SALES>" field "□" are character strings "5 FIGURES" and "ROUND DOWN", both written in blue. These are written signs for document data-management and indicate that numerical data (of money) to be filled in respective cells of the sales field must be expressed in five significant figures and rounded down.

Entered in the right bottom area of the source document is a black colored ordinary writing "SALES=PRICE× QUANTITY" which is enclosed by a blue colored "search-dictionary" written sign "○" and in which each term "SALES", "PRICE", "QUANTITY" is bracketed by a blue colored "data item designating" written sign "< >." Added with such written signs, the arithmetic formula of the ordinary writings is now qualified for a data managing descriptor which indicates that data of the data item "<SALES>" must be obtained by multiplying data of the data item <price> by data of the data item "<SALES>."

The source document of FIG. 9 contains red colored written signs for descriptors pertaining to the "FORMAT- DOCUMENT" group as follows. At top, blue colored format-document written signs "▽" indicate tabs as margins of the document. At top center, a black colored ordinary writing of the title "SALES LEDGER" is written and its ends are marked by red colored written sign "> <" for a format-document descriptor for marking an object. A red colored written sign "C" for a centering descriptor element is entered by the title. Also a blue colored written sign "C" for a centering descriptor element is entered in each data item name cell of "ARTICLE", "QUANTITY", "PRICE" and "SALES." These format-document descriptors indicate that the title "SALES LEDGER" is centered between left and right tabs "▽" and that each data item name "ARTICLE", "QUANTITY", "PRICE", "SALES" must be centered in the associated tabular cell.

A red colored written sign "C" for a centering descriptor element or "R" for a right justification descriptor element is marked within each data item field. This indicates that a data character string to be filled in respective tabular cells within each data item field must be centered or right justified.

The source document of FIG. 9 includes a written sign for descriptor pertaining to the "EDIT-DOCUMENT" group. Specifically, a blue colored written sign "=" for delete descriptor is entered over "LEDGER" of the title "SALES LEDGER."

Figure 10:
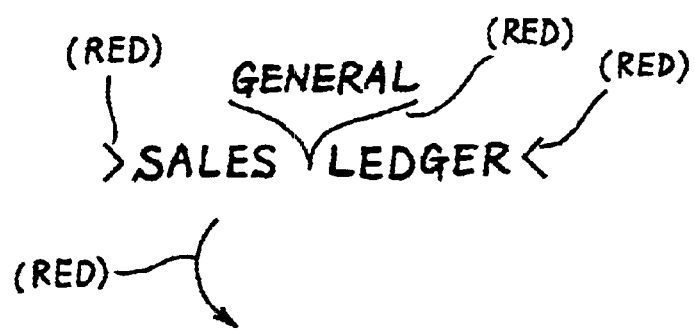
FIG. 10 illustrates how written signs for descriptors pertaining to an edit-document group are used in accordance with the embodiment system.

FIG. 10 shows another example of written signs for descriptor pertaining to the "EDIT-DOCUMENT" group. A black colored ordinary writing "SALES LEDGER" (which is to be edited) is bracketed by an object marking written sign "> <." A red colored written sign "V" for an insert descriptor indicates inserting "GENERAL" between "SALES" and "LEDGER" to make an edited character string "SALES GENERAL LEDGER" which is to be moved to desired location, as indicated by a red colored written sign "→" for a move descriptor.

The description now turns to features for making an electronic document from the source document with additional written signs for descriptors in FIG. 9.

Figure 11:
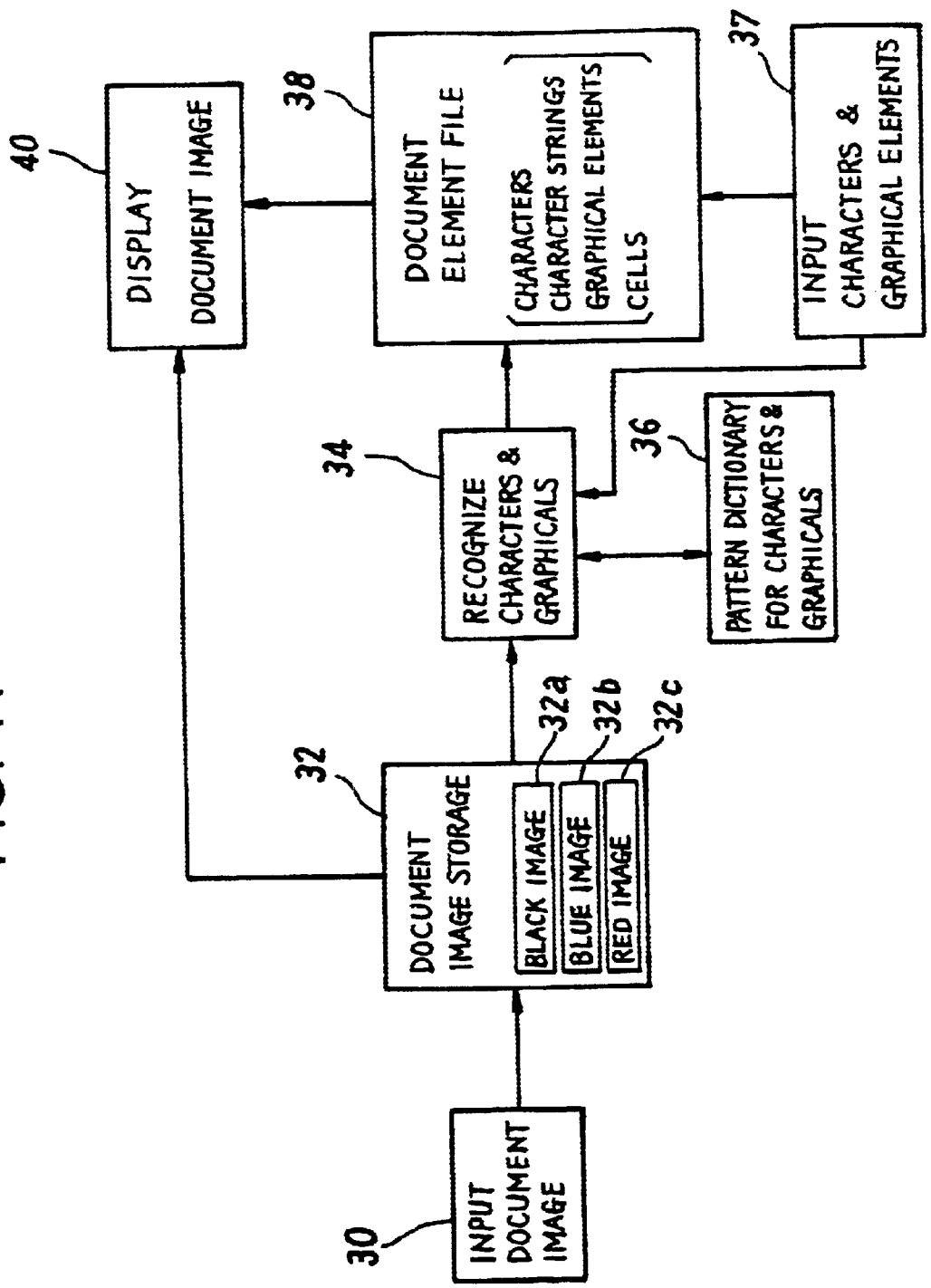
FIG. 11 is a block diagram showing functions of a subsystem in the embodiment for inputting a source document and creating a document element file.

FIG. 11 shows a function in the embodiment system for inputting a document and creating a document element file therefrom. An input document image block 30 is implemented by the color image scanner 10, keyboard 12 and/or mouse 14 as an input equipment, CPU 24 for executing input routines and storing and an internal or external storage 16, 18 for receiving the entered color image. A document image storage 32, pattern dictionary 36 for characters and graphicals and document element file storage 38 each resides in the internal or external storage 16, 18. A recognize characters and graphicals block 34 is implemented by CPU 24 for executing a recognize characters and graphicals routine. A display document image block 40 is implemented by CPU for executing a display control program and the display unit 20 for displaying a document image under the control of CPU 24.

Figure 12:
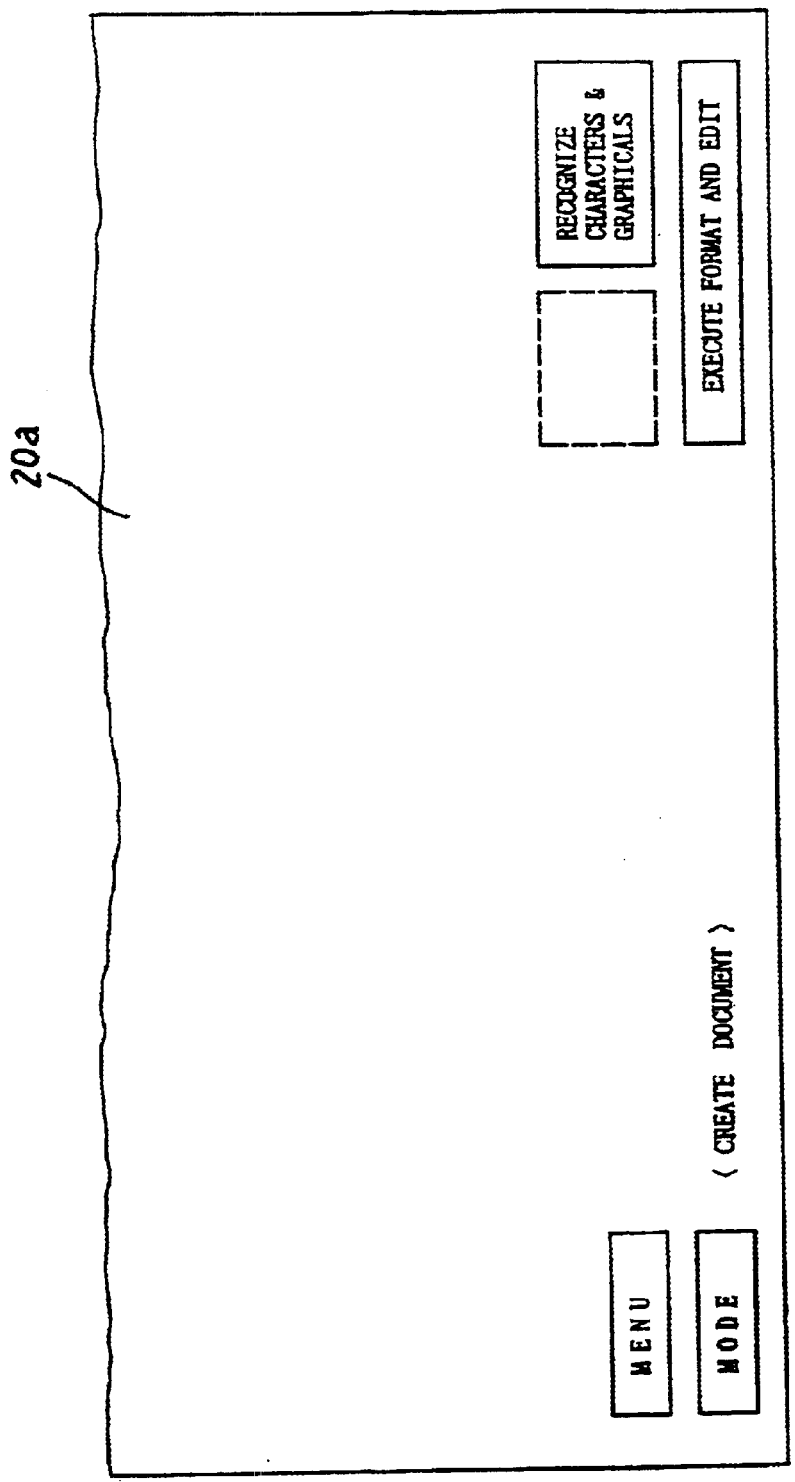
FIG. 12 is a view of a create document mode screen in accordance with the embodiment system.

The color image scanner 10 reads a source document with descriptor written signs, such as the one shown in FIG. 9. The user sets the source document sheet on the color image scanner, selects a create document mode, as shown in FIG. 12, and clicks a "RECOGNIZE CHARACTERS AND GRAPHICALS" button from the display screen 20a.

The clicked operation enables the image scanner 10 to read the source document image of FIG. 9. The color image data from the scanner 10 is stored into an document image storage in the input block 30. The color image data representative of the source document is decomposed into black, blue and red color image components, respectively which are respectively stored into a black image storage 32a, blue image storage 32b and red image storage 32c within the document image storage block 32.

The recognize characters and graphical block 34 recognizes from each colored image component of black, blue and red from the document image storage block 32, individual characters and graphical elements. The graphical element refers to simple graphical symbols such as line, rectangle, circular loop etc., having a shape which is easy to be pattern-recognized.

Figure 13:
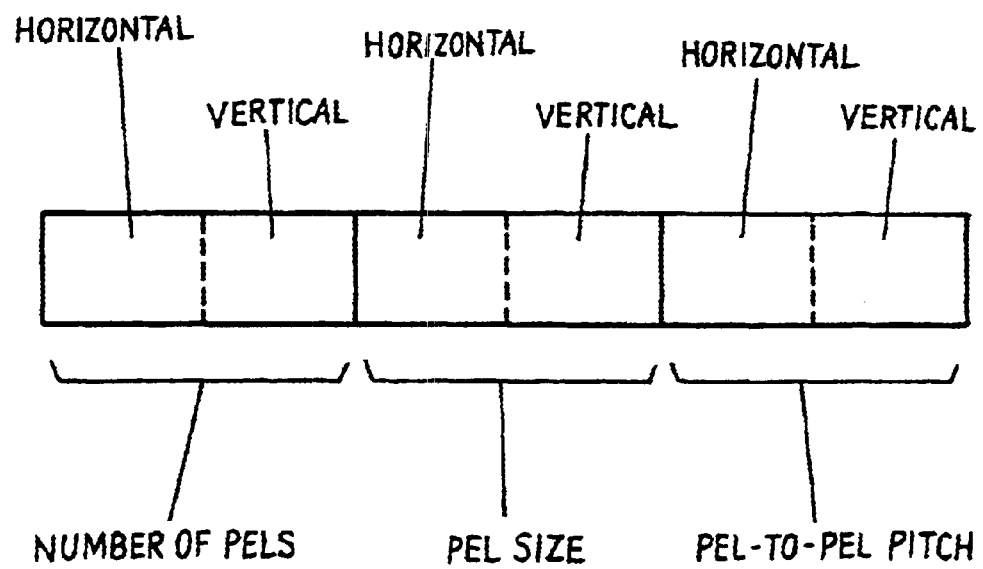
FIG. 13 shows a data format of an image convention record in the embodiment system.
Figure 14:
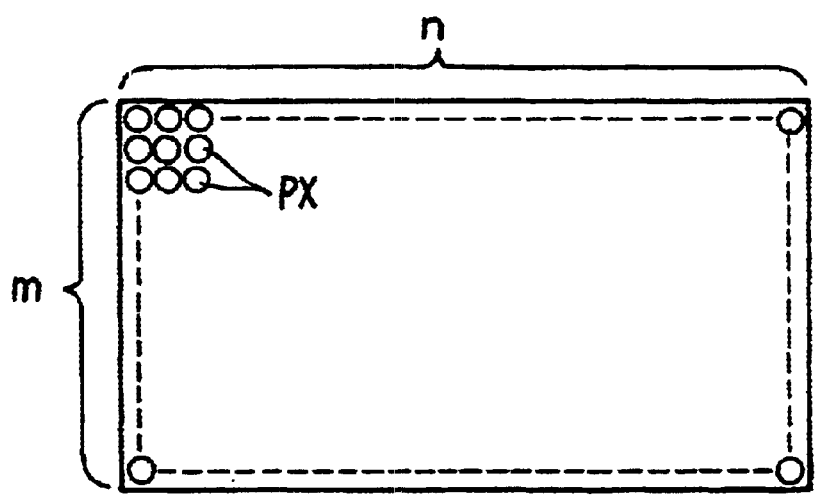
FIG. 14 is a diagram showing a screen image configuration specified by the image convention record.

In connection with the image pattern-recognition, an image convention record, such as the one shown in FIG. 13 is referenced. The image convention record specifies the entered image data structure which is configured by a matrix of large number of (pels) PX, specifying the number of pels PX, pel size, pitch etc.

The recognize characters and graphicals block 34 recognizes individual characters and graphical elements based on stroke analysis which strokes constituting a character or graphical are found. Any suitable prior stroke analysis may be employed. For example, a group of dots having a specific color is first located. Then a nearby or surrounding area is searched to find an extending direction of the dot group. The process of the dot group tracing repeats until the stroke drawn by such dot group terminates. In the tracing, when the stoke has changed suddenly, the point is identified as a deflection or vertex.

Each stroke is classified into one of predetermined stoke patterns, depending on shape and size. In the embodiment, the pattern dictionary 36 for characters and graphicals, as an electronic dictionary, has stored stroke features and special relationship between constituent strokes for respective characters and graphical elements. The recognize characters and graphicals block 34 repeats matching process involving matching a combination of adjacent strokes found in the stroke analysis against entries in the pattern dictionary 36 to thereby recognize individual characters, symbols and graphicals.

In the character recognition, when a plurality of adjacent characters having a similar character height within allowable character size variation and within allowable character to character pitch variation are found, these characters are recognized as a characters string as syntax unit. Their character size or height is adjusted to a normalized height. The measured character-to-character pitch is normalized to an equal pitch as default. In the character string, if the character-to-character size variation falls within the allowable limit, the characters forming the character string are adjusted to a common character size.

Ruled lines of the document table are recognized as follows. At first, the stroke analyzer recognizes straight lines. If such a straight line is much longer than an ordinary line and generally extends horizontally (X axis) or vertically (Y-axis), the line is considered a horizontal or vertical ruled line. The direction of the found ruled line is adjusted in parallel to a horizontal or vertical line. In the case when a ruled line end is found close to an end or point of another ruled line within a predetermined limit, the ruled line end is considered meeting or coinciding with another ruled line end or point and the ruled line location is adjusted correspondingly.

Ruled lines of the tabular document form individual rectangular blocks or cells in which data is to be filed. Such tabular cells may be identified using any suitable prior art method for searching all ruled lines.

The recognize characters and graphicals block 34 recognizes characters and graphicals from respective colored image data (black, blue, red) of the entered source document, as mentioned above, to thereby create document element records of character, character string, graphical element, mark, cell etc., according to the data format shown in FIG. 15 to FIG. 20.

Figure 15:
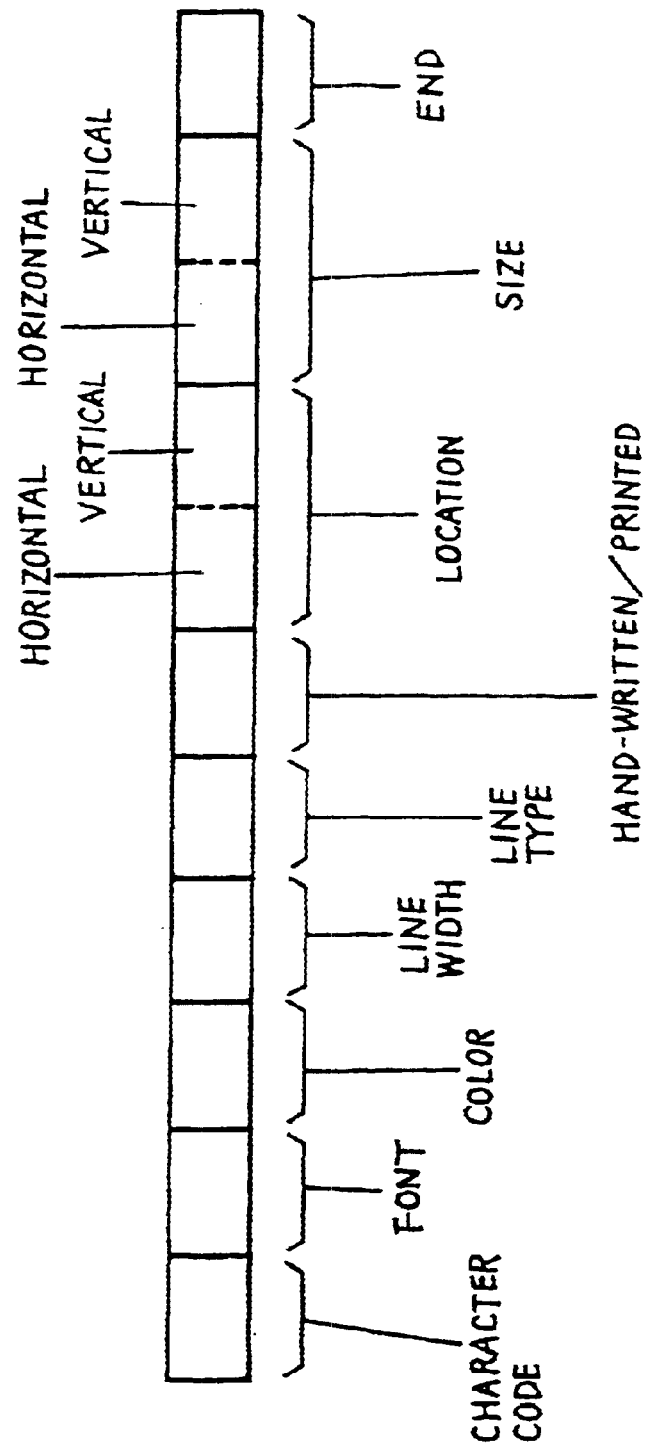
FIG. 15 shows a data format of a character record in accordance with the embodiment system.

FIG. 15 shows a document element record (character record) of a single character. The character record includes a character code, font, color, line width, line type (solid, doted, chained etc.,), hand-written/printed (meaning that the character is hand-written or printed), location and size (character size) in respective data fields, and ends with an end of record "END."

Figure 16:
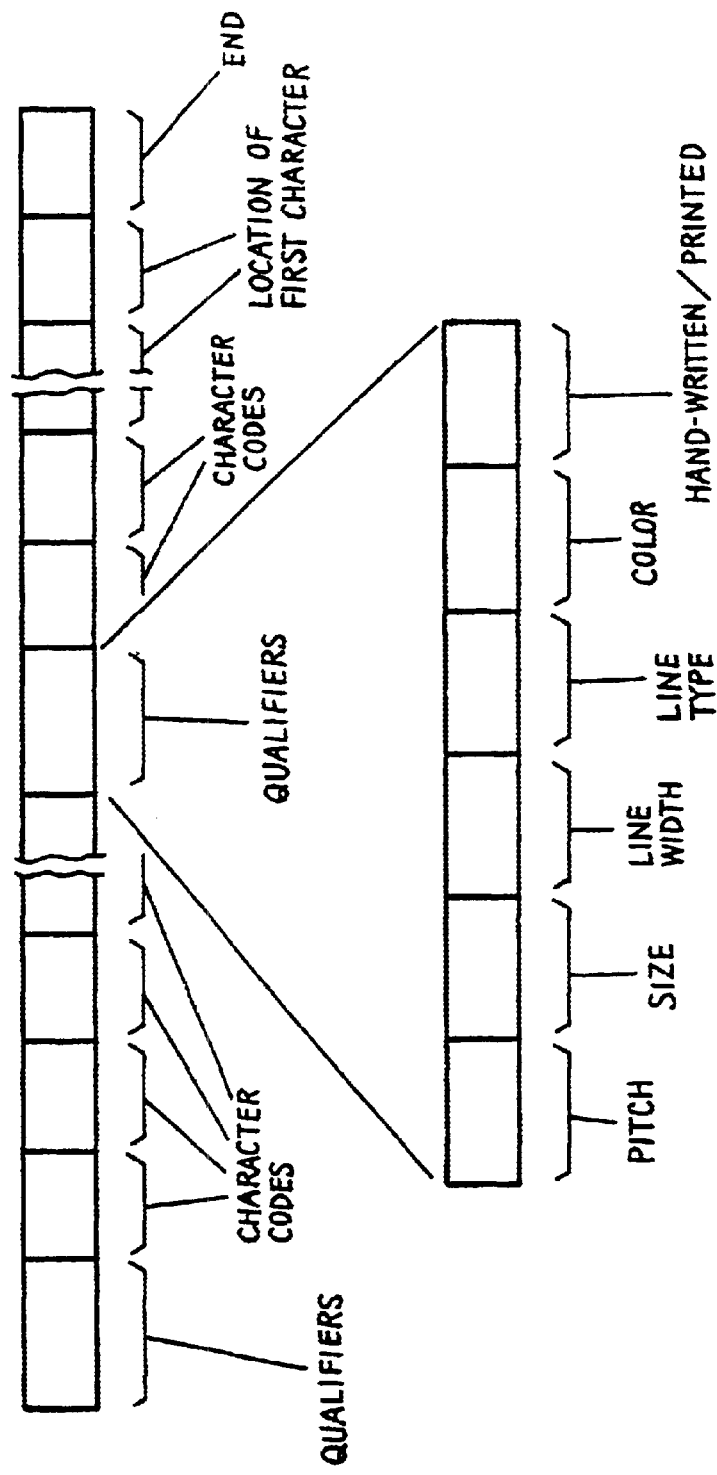
FIG. 16 shows a data format of a character string record in accordance with the embodiment system.

FIG. 16 shows a document element (character string) record of a character string. The character string record starts with qualifiers for specifying character string attributes such as character-to-character pitch, size (character size) etc., followed by character codes for the character string. A composite character string such as "2000KM" is constructed by partial strings "2000" and "KM" having different character size and pitch attributes. Such a composite character string is represented by a chain of character string records each corresponding to a partial string of the composite character string.

Figure 17:
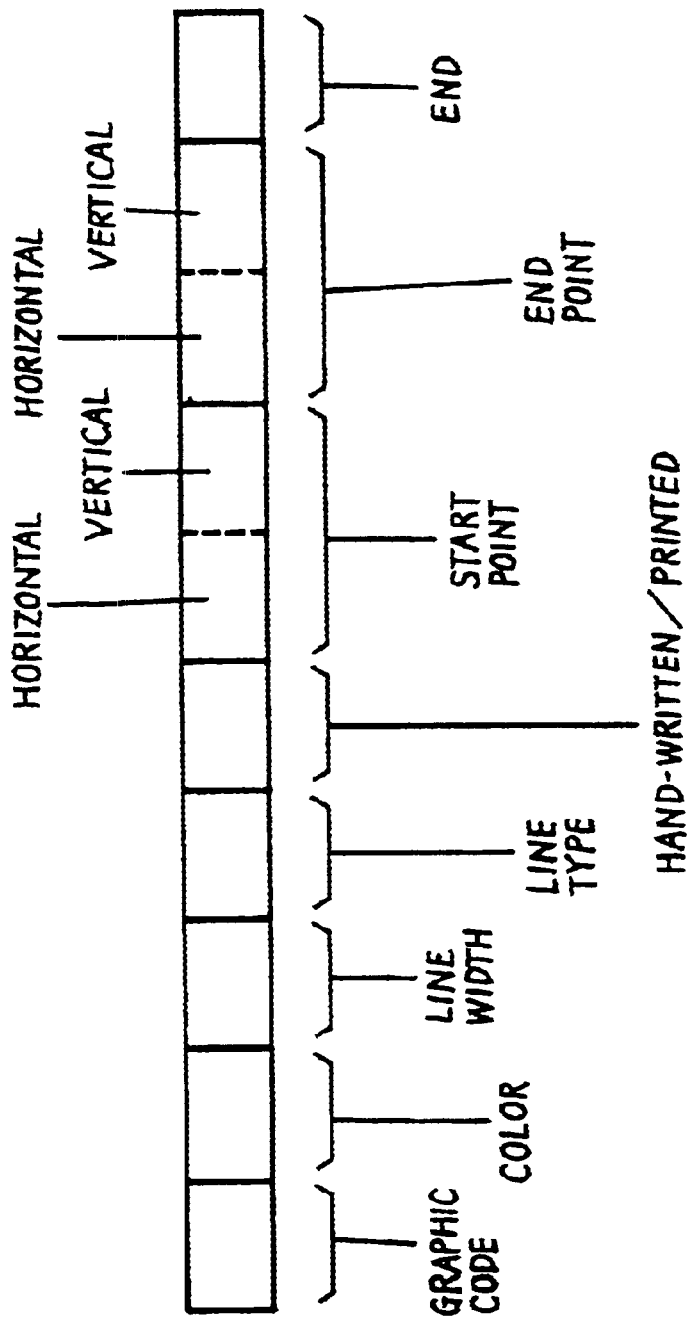
FIG. 17 shows a data format of a graphic element record of a line in accordance with the embodiment system.
Figure 18:
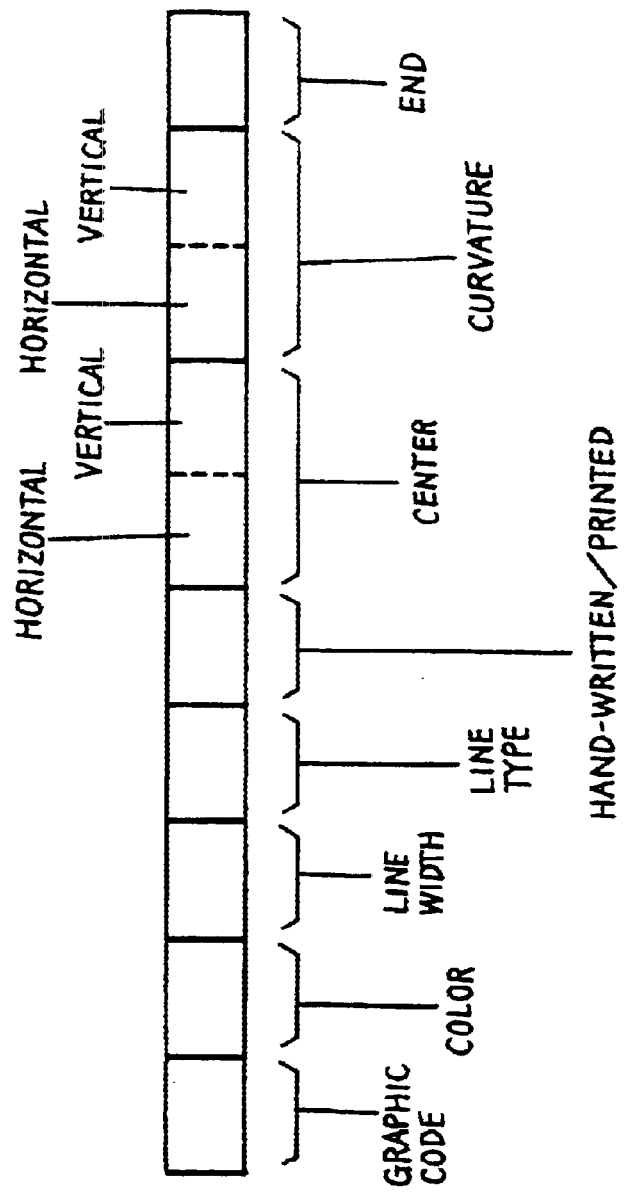
FIG. 18 shows a data format of a graphic element record of a circular loop in accordance with the embodiment system.
Figure 19:
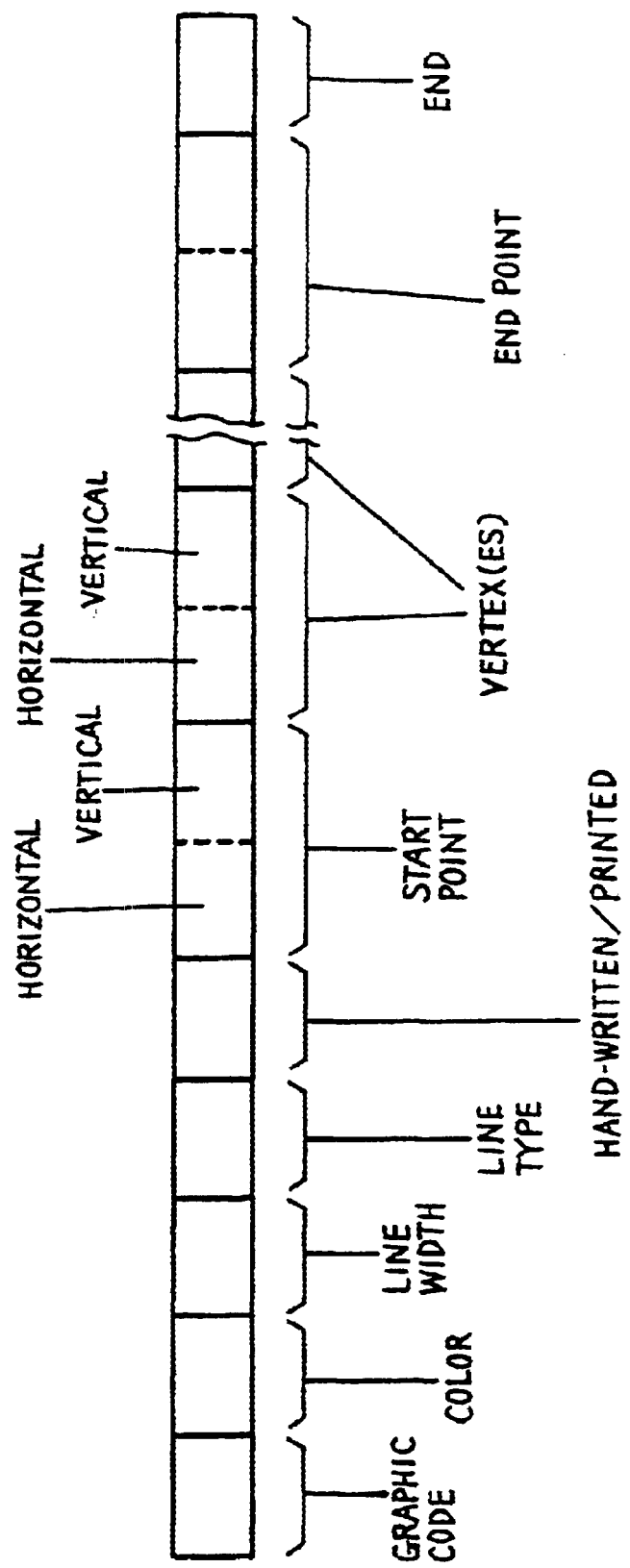
FIG. 19 shows a data format of a graphic element record of a rectangle etc., in accordance with the embodiment system.

FIGS. 17, 18 and 19 show document element (graphic element) records each corresponding to a single graphical element or mark. As shown in FIG. 17, a graphic element record of a line includes start and end point data of the line. As shown in FIG. 18, a graphic element record of a circular loop includes data of center location (x, y) and curvature size (for x and y direction). As shown in FIG. 19, a graphic element record of a rectangle, "<" or the like, includes data of deflection point or overtex (where the stroke direction changes) in addition to start and end points.

Figure 20:
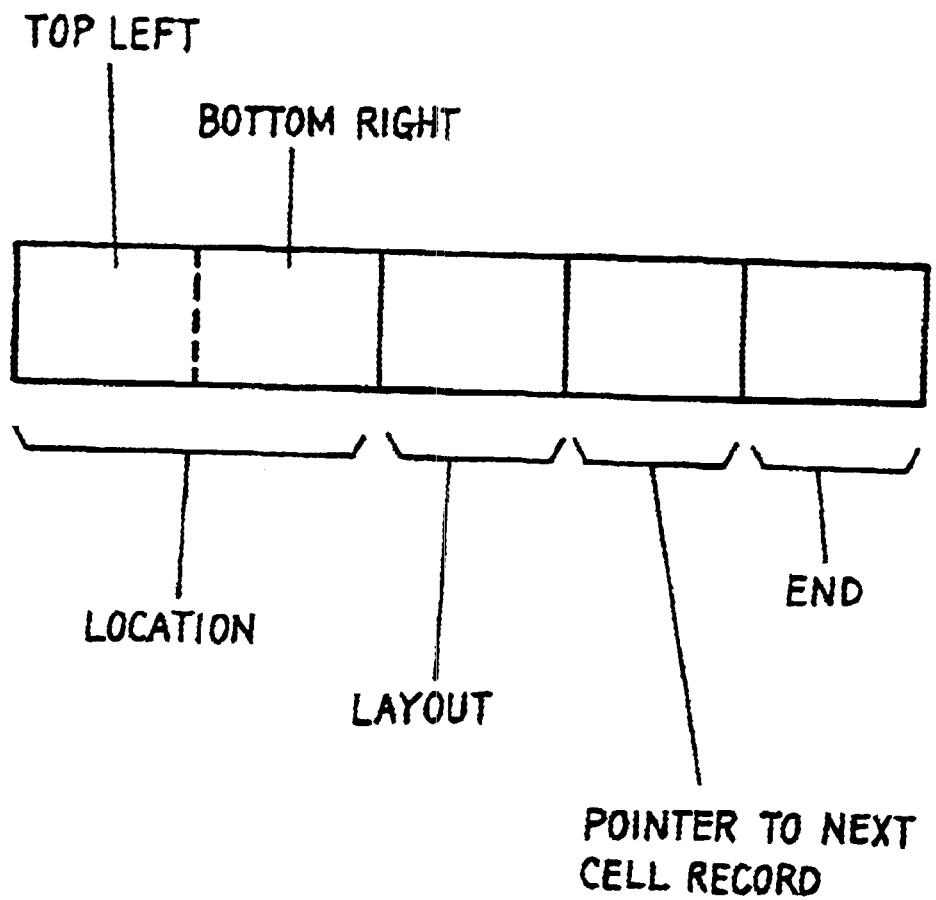
FIG. 20 shows a data format of record of a cell (in which data is to be filled in) in accordance with the embodiment system.

FIG. 20 is a document element (cell) record of a single tabular cell in which data is to be filled. Each cell record includes data of the cell location and a pointer to the next cell record of a next cell (e.g., the one below) within the same field. Each document element record is allocated an unique address in the document element file storage 38. Using a pointer set in a document element record, any other desired document element record can be retrieved.

In this manner, the recognize characters and graphicals block 34 recognizes individual characters (character strings), symbols and graphicals included in the entered source document image and makes document element records thereof. The collection of the document element records are stored into the storage 38 as a document element file. Those image entries of written signs or items whose elements have been recognized into document element records may be deleted from the document image storage 32.

The display document image block 40 may display, on the screen 20a of the display unit 20, an image of the entered source document based on the image data in the document image storage 32. It may also display an image of the entered source document from the document element file storage 38 by reconstructing image data from the stored document element records.

Having completed the document element file, the embodiment system informs the user of the completion of the create document element file job via the display screen 20a.

Then, the user may click the "MODE" button normally presented at the bottom left of the display screen 20a to select "DEFINE" mode. This invokes a specify descriptor group attributes screen shown in FIG. 21 on the display screen 20a.

Figure 21:
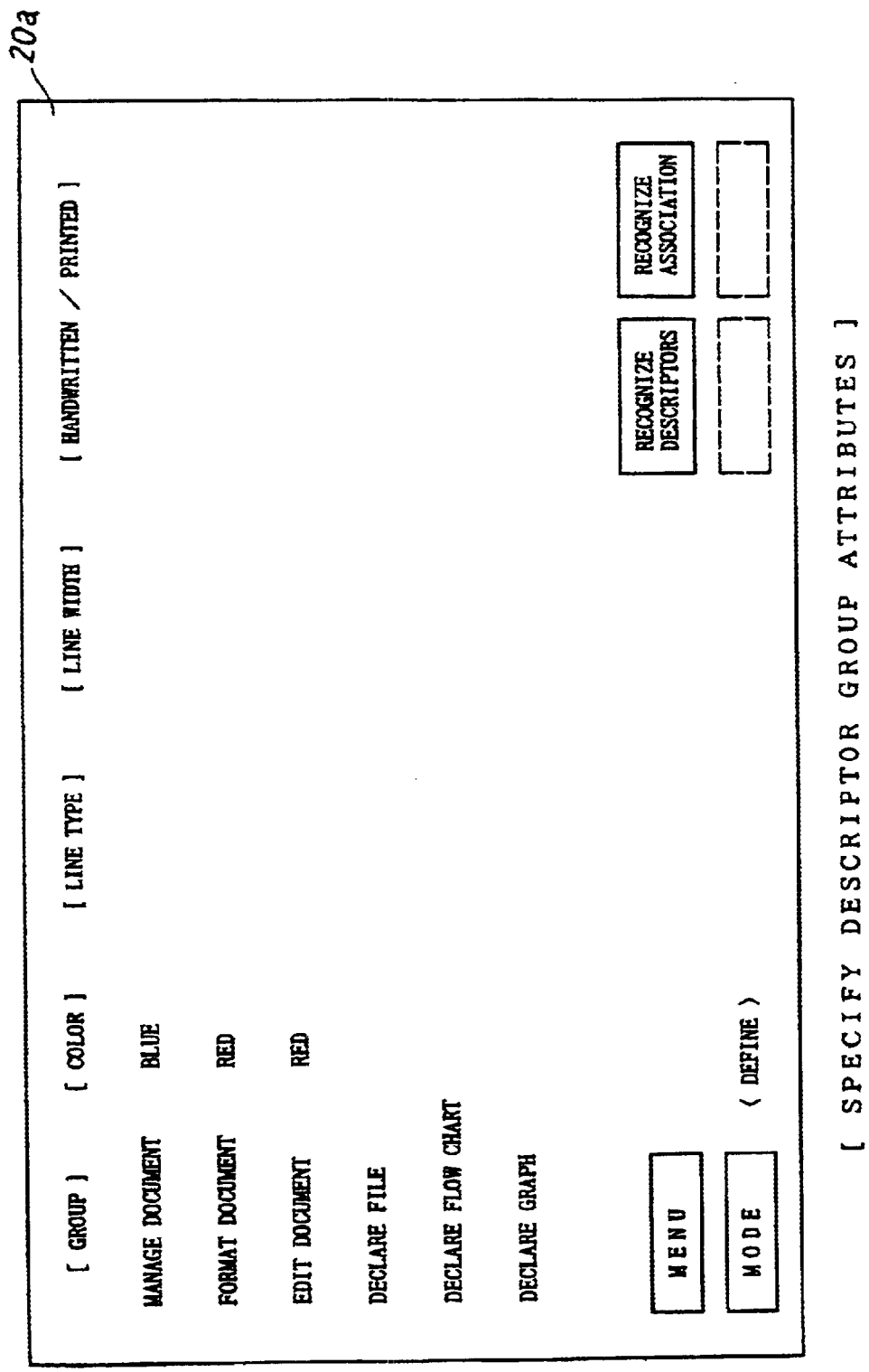
FIG. 21 is a view of a specify descriptor group attributes screen in accordance with the embodiment system.

In FIG. 21, a "GROUP" column lists up descriptor groups, such as "MANAGE DOCUMENT", "FORMAT DOCUMENT", "EDIT DOCUMENT", etc. The user may enter or specify attributes of respective descriptor groups, such as color, line type, line width and hand-written/printed, as employed in the entered source document. In the case of FIG. 9, the manage document group has a color attribute of "BLUE", and the "FORMAT DOCUMENT" and "EDIT DOCUMENT" group each has a color attribute of "RED", as entered in the screen of FIG. 21.

Having entered the descriptor group attributes, the user may select either "RECOGNIZE DESCRIPTORS" or "RECOGNIZE ASSOCIATION" to terminate the mode of "SPECIFY DESCRIPTOR GROUP ATTRIBUTES." Since, in the above, the recognize characters and graphicals has been completed, the user will select the "RECOGNIZE DESCRIPTORS" button.

Figure 22:
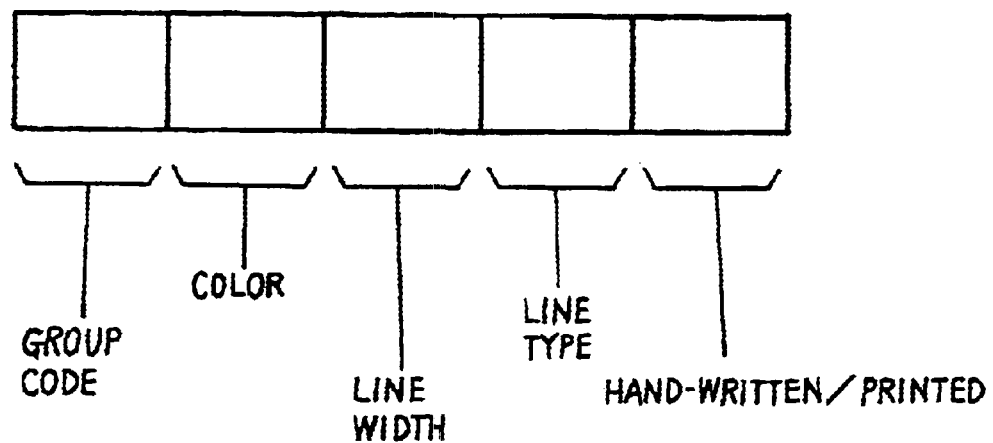
FIG. 22 shows a data format of a descriptor group attributes specifier in accordance with the embodiment system.

As a response, the system makes descriptor group attribute records, such as one shown in FIG. 22, for respective descriptor groups. A set of descriptor group attribute records are stored into a group attribute file storage 50 (FIG. 23), which will be used for creating descriptor records.

Figure 23:
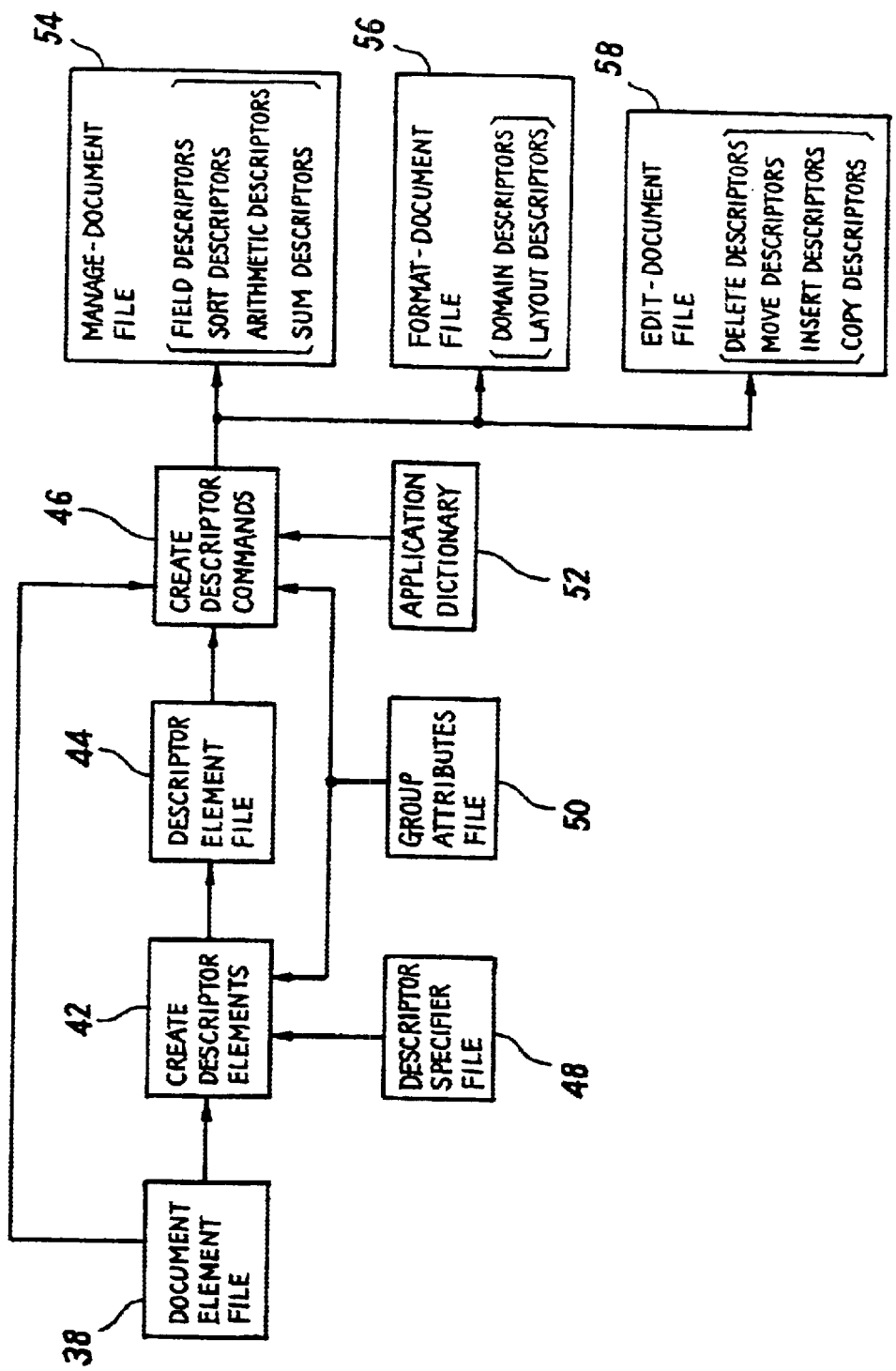
FIG. 23 is a block diagram showing functions of a subsystem in the embodiment for constructing descriptors and formatting a document.

FIG. 23 shows a feature of the embodiment for recognize descriptors and formatting a document. A create descriptor elements block 42 and create descriptor command block 46 are implemented by CPU 24 for executing process of creating descriptor elements and descriptors. The descriptor element specifier file storage 48, group attribute file storage 50, application dictionary storage 52, manage-document file storage 54, format-document file storage 56 and edit-document file storage 58 reside in internal and/or external storage 16, 18.

Having made the group attribute records (FIG. 22), the system starts to recognize descriptors. The create descriptor elements block 42 looks up the descriptor element specifier file 48 of descriptor element specifier records (FIG. 7) and the group attribute file 50 of descriptor group attribute specifier records (FIG. 22), for descriptor element identification and creates descriptor element records from the descriptor element file storage 38 storing document element records (FIGS. 15 to 20).

Figure 24:
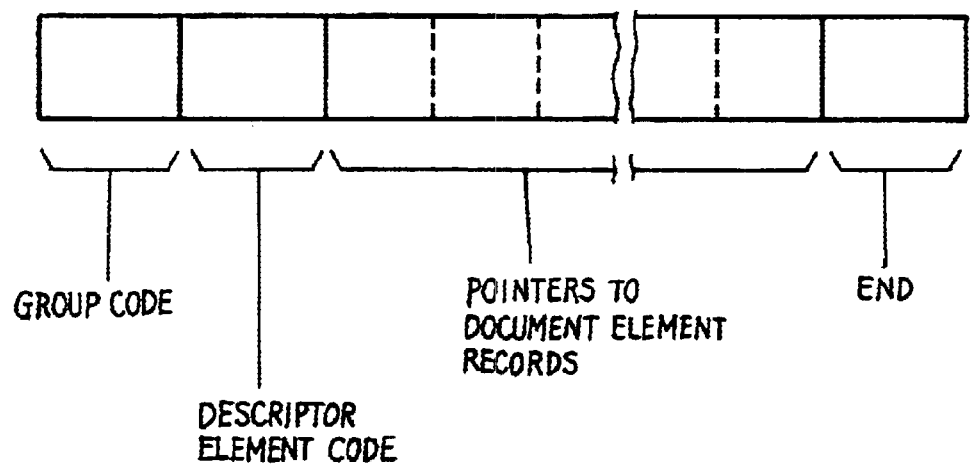
FIG. 24 shows a format of a descriptor element record in accordance with the embodiment system.

FIG. 24 shows a descriptor element record data format. The descriptor element record includes a descriptor group code and descriptor element code for identifying the descriptor element, and pointer(s) to document element record(s) that specify or constitute the descriptor element. For example a descriptor element record "CENTERING" includes a pointer to a document element record written sign "C" which specifies the descriptor element.

To create descriptor element records, the system first searches for those document element records pertaining to "MANAGE DOCUMENT" group having a blue color qualifier. In the search, if a written sign "<" has been found, the system searches for another written sign ">" to be paired, thus identifying a descriptor element written sign "< >" indicative of a data item name descriptor element pertaining to the "manage document" group. A descriptor group code and a descriptor element code have now been determined and pointers to document element records of "<" and ">" in the document element file storage have also been determined.

Similarly, those descriptor element records pertaining to red color qualified "FORMAT DOCUMENT" and "EDIT DOCUMENT" groups may be created from corresponding document elements records.

The descriptor element records from the create descriptor elements block 42 are stored into the storage 44 as a descriptor element file.

Then, the create descriptor commands block 46 creates or constructs descriptor records from the descriptor element data (FIG. 24) stored in the descriptor element file storage 44 and from the document element data (FIGS. 15 to 20) stored in the document element file storage 38 while looking up the group attribute file 50 storing group attribute specifiers (FIG. 22).

The process of creating descriptors by the block 46 involves creating "MANAGE-DOCUMENT" descriptors, "FORMAT-DOCUMENT" descriptors and "EDIT-DOCUMENT" descriptors in the order.

Figure 25:
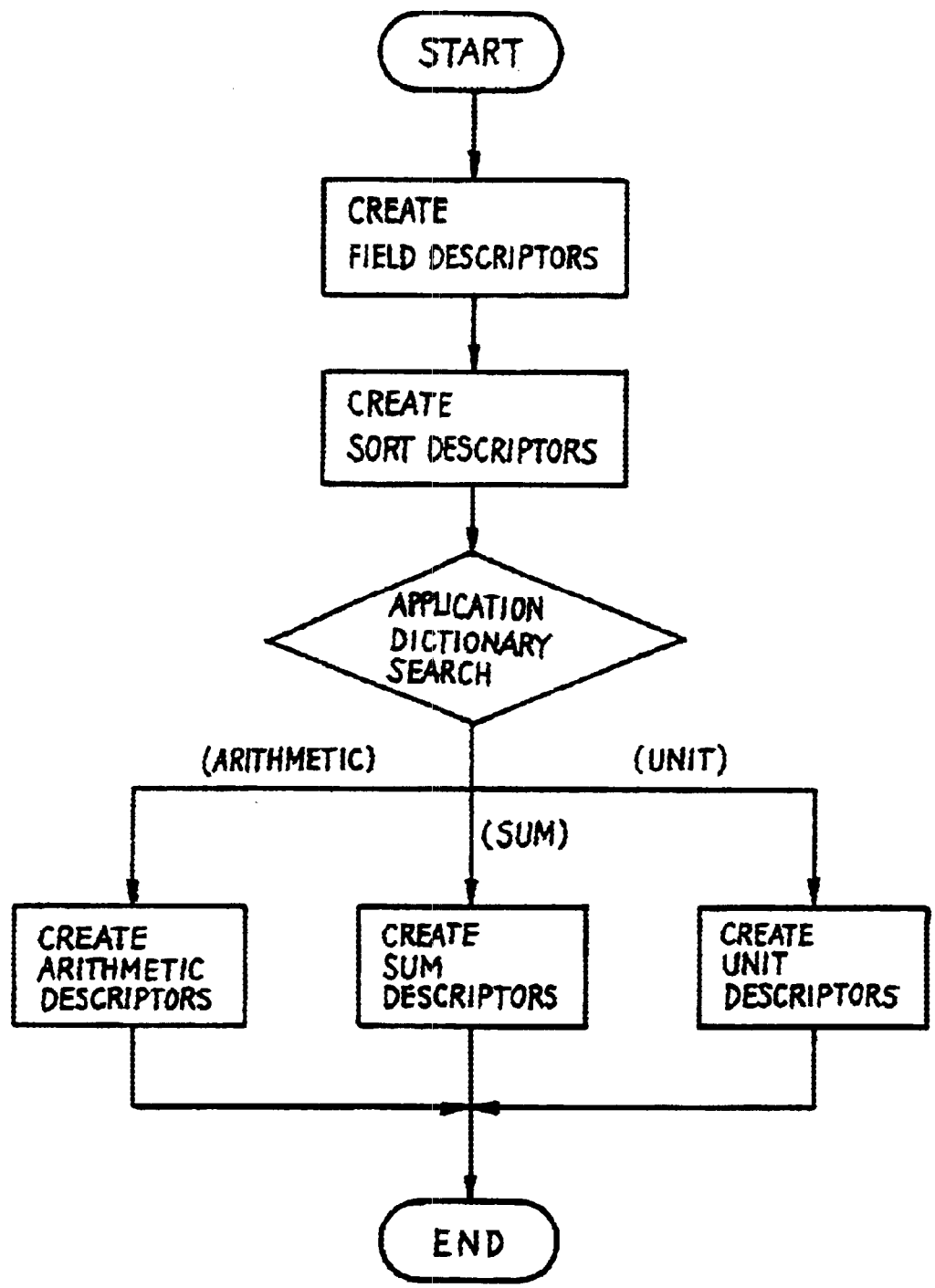
FIG. 25 is a flow chart of creating descriptors pertaining to a manage-document group in accordance with the embodiment system.
Figure 26:
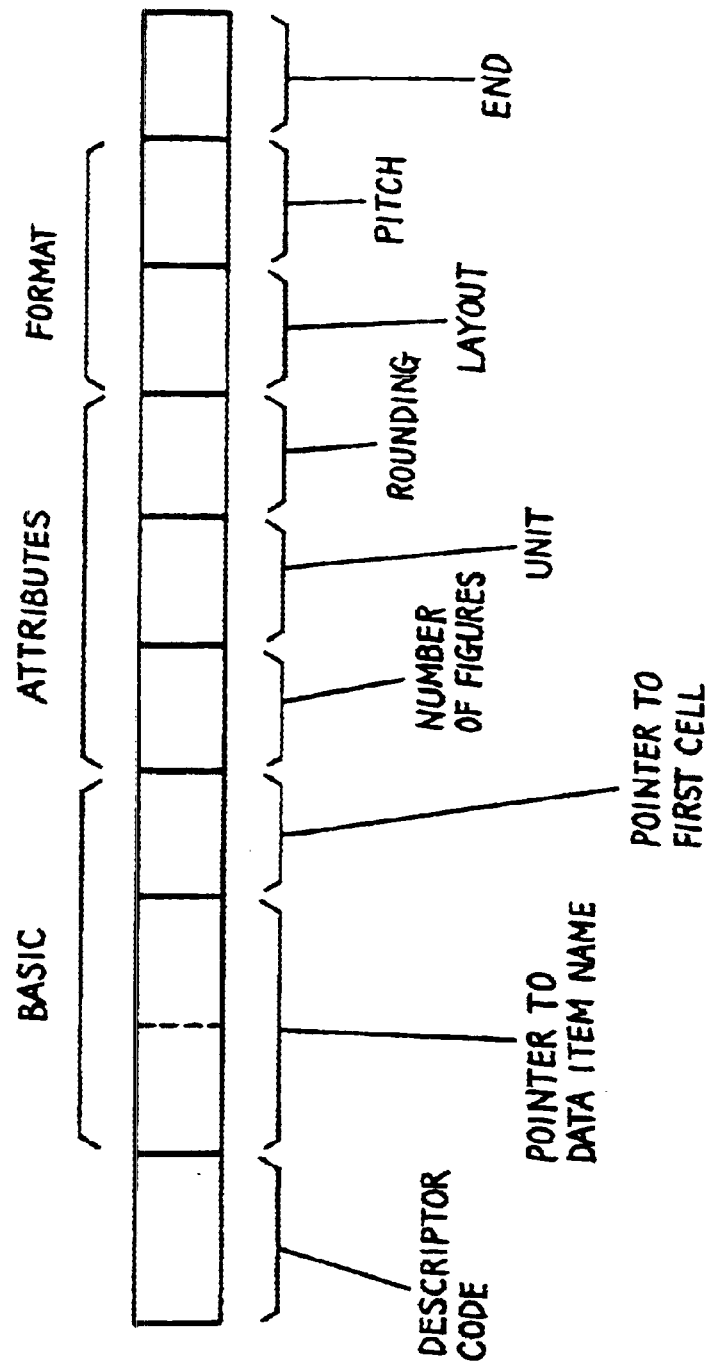
FIG. 26 shows a data format of a field descriptor in accordance with the embodiment system.

The descriptors pertaining to "MANAGE-DOCUMENT" group are created according to the flow chart of FIG. 25. First, "FIELD" descriptor records are created, followed by create sort descriptors, followed by search application dictionary to create arithmetic descriptors, sum descriptors and unit descriptors. FIG. 26 shows a field descriptor record data format. Each field descriptor record includes a descriptor code of field descriptor. A data item name pointer field in the field descriptor points to a document element record of a character or character string indicative of the data item name of the field. A cell pointer field in the field descriptor record points to a first cell in the field specified by the written sign "□". Since cell data records are chained by pointers (see FIG. 20) so as to cover a field, it suffices to point to the first cell data record in the chain.

The field descriptor record is constructed as follows. First, the system searches through descriptor element file 44 data for a descriptor element (link) record of a blue colored written sign "-." Using the link descriptor element record's pointer, the system retrieves from the document element file the "-" document element record to find the location of the link mark "-." Then, using data item and field descriptor element records, the system finds out associated written signs "< >" and "□" that locate near the written sign "-." Written sign location data in the document element records are sequentially examined to locate the associated written signs.

Then, from the locations of the written signs "<" and ">" for designating data item name, a character or character string placed between the written signs "<" and ">", indicative of the data item name, is searched. The search for the data item name character string also involves sequentially examining location data in document element records. The address of the document element record storing the data item character string is set into the data item name pointer.

Then, the system searches for association of a field written sign "□" with a data item name designating written sign "< >" in which the association is made as default without any link written sign "-." This search also involves sequentially matching the location data in "the field" written sign "□" against location data in data item name written signs "< >." In this connection, if a field and a data item name character string are located in the same column or row, it is determined that they are associated with each other. The found data item name character string document element record's address information is used as the data item name pointer.

In this manner, a basic portion of the field descriptor records has been determined by finding the association between the field and the data item character string, as mentioned above.

Next, the system retrieves field attribute written signs, such as "ROUND DOWN" and "5 FIGURES", and field format written sign, such as "C" for centering and "R" for right justification, and proceeds as follows.

At first, the system searches through a link descriptor element records of written sign "-" and field descriptor element records of written sign "□" and locates a field attribute written sign and/or field format written sign that is connected to the field written sign "□" via the link written sign "-." (no such example found in FIG. 9.) In absence of link written sign "-", if a field attribute and/or field format written sign locates in the field of interest, such a written sign is considered associated with the field.

When a field attribute written sign, field format written sign and field written sign "□" have been found associated each other, the field descriptor record (FIG. 26) of that field written sign "□" is retrieved and the field attribute and field format codes specified by the associated field attribute field format written sign are used to make attribute and format data fields of the field descriptor record. That is the field attribute data field is set to code(s) of field attribute(s), such as "ROUND DOWN" and "5 FIGURES." The field format data field is set to code(s) of field layout commands such as "CENTERING" and/or "RIGHT JUSTIFICATION." In this manner the field attribute and field format have been determined, completing the field descriptor record.

Figure 27:
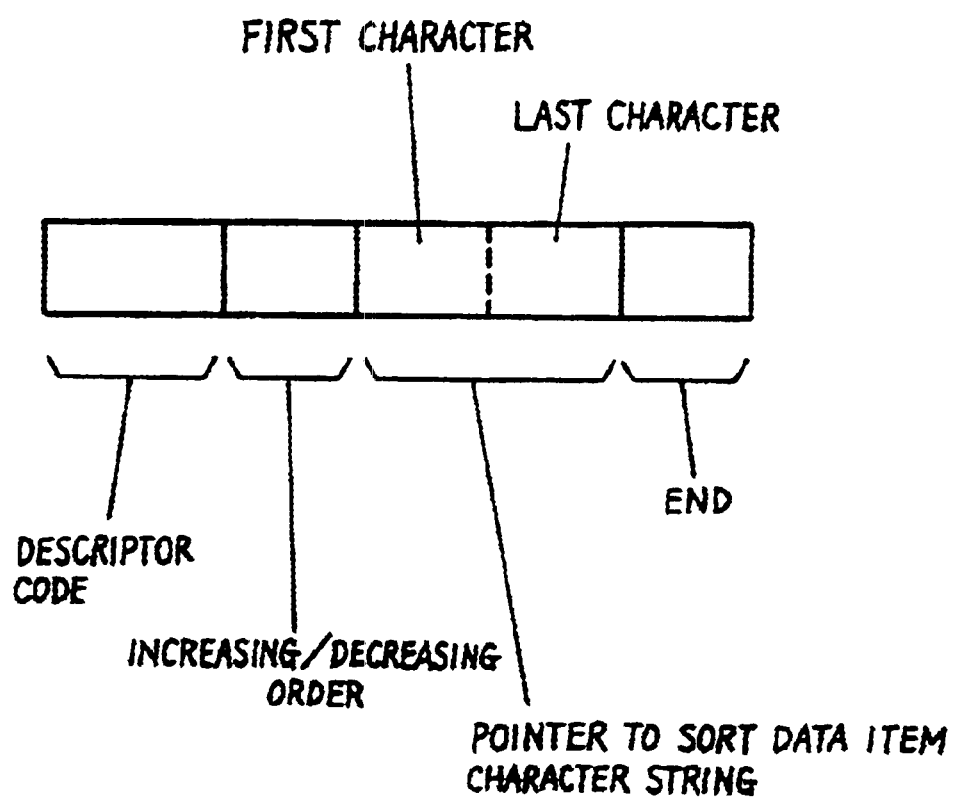
FIG. 27 shows a data format of a sort descriptor in accordance with the embodiment system.

FIG. 27 shows a sort descriptor record data format. The sort descriptor is created as follows. At first, the system retrieves from the descriptor element file 44 a sort descriptor element record corresponding to "↑" for data increasing order or "↓" for decreasing order. Then, the system searches for a field written sign "□" that includes the sort written sign "↑" or "↓" of interest. This search involves sequentially examining location data in the document element data records.

Next, the system picks up the field descriptor record (FIG. 26) corresponding to the found field written sign "□", and copies the data item name pointer therein into the pointer to sort data item name character string in the sort descriptor, thus completing the sort descriptor.

Having created sort descriptor, the system creates "SUM DESCRIPTOR", "ARITHMETIC DESCRIPTOR" and "UNIT DESCRIPTOR."

According to the convention of descriptors/written signs employed in the embodiment, certain data-managing written signs, meaning of which must be determined by the system, such as arithmetic formula and unit name character strings etc., are each enclosed by a "SEARCH APPLICATION DICTIONARY" written sign "○" or entered in a specified color. The create descriptor commands block 46 searches through the descriptor element file 44 data for those descriptor element records of a data-managing character string marked by "SEARCH APPLICATION DICTIONARY" written sign "○" or entered in a specified color and matches such a character string against entries in the application dictionary 52 to find a matched entry. Depending on the matched entry a corresponding descriptor record is created.

FIG. 28 illustrates an application dictionary 52 with entries. The application dictionary storage 52 stores available terms (character, character string, mark or symbol) or nomenclature for each entry group.

Figure 29:
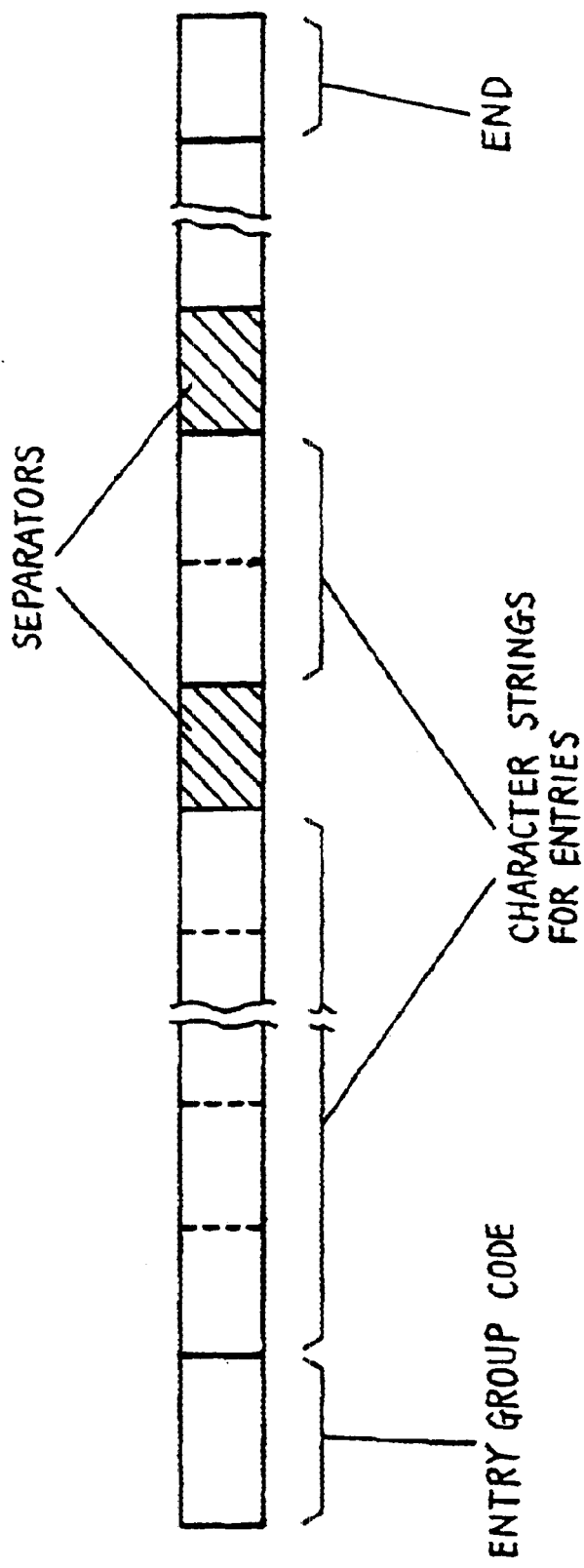
FIG. 29 is a data format of a dictionary entry record in accordance with the embodiment system.

FIG. 29 illustrates a dictionary entry record in the application dictionary storage 52. The dictionary entry record includes an entry group code such as "UNIT", "ARITHMETIC" and "SUM" etc. The entry group code, as header, is followed by a set of character strings for entries (in the form of character, character string and/or mark) indicative of entry terms pertaining to the entry group. The separators shown in FIG. 29 correspond to alternative marks (,) in FIG. 28 for separating entry terms.

In FIG. 9, the arithmetic formula character string "<SALES>=<PRICE>×<QUANTITY> " at bottom and right of the source document is enclosed by "SEARCH APPLICATION DICTIONARY" written sign "○." Finding out data item name designating written signs < > and operation marks =, ×, included in the arithmetic formula, the system identifies the character string of "<SALES>= <PRICE>×<QUANTITY>" as arithmetic formula command. Then the system executes a create arithmetic descriptor routine.

Figure 30:
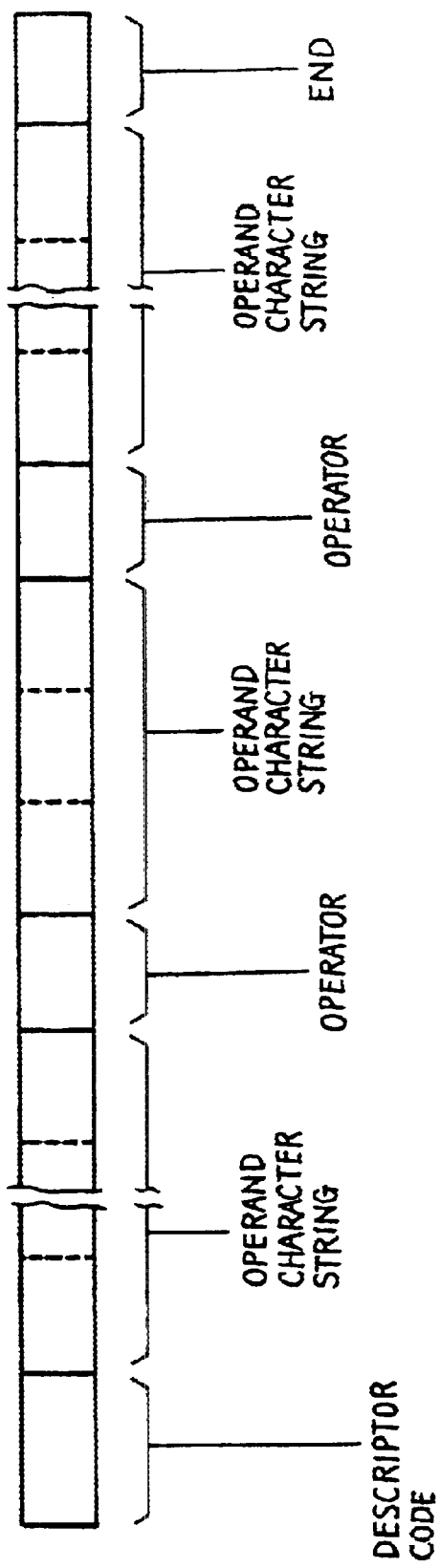
FIG. 30 shows a data format of an arithmetic descriptor record in accordance with the embodiment system.

The create arithmetic descriptor routine decomposes an arithmetic formula character string into data item character strings of operand and operator marks sequentially from the top and sets them into the arithmetic descriptor shown in FIG. 30.

FIG. 30 shows an arithmetic descriptor record data format. For the arithmetic descriptor record of the arithmetic formula "<SALES>=<PRICE>×<QUANTITY>" in FIG. 9, character strings of "SALES", "PRICE" and "QUANTITY" are respectively set into corresponding character string data field whereas operator codes of "=" and "×" are stored into corresponding operator data field.

At bottom cell of the quantity field, a blue colored "SEARCH APPLICATION DICTIONARY" written sign "○" encloses "Σ." As a result of search application dictionary 52, the written sign "Σ" is identified as a sum command. Thus the system branches into a create sum descriptors routine.

The create sum descriptors routine retrieves a field written sign "□", a link written sign "-", and a blue colored written sign "Σ" or black colored written sign "Σ" enclosed by a blue colored "SEARCH DICTIONARY" written sign "○." From the three marks of "□", "-" and "Σ" in which the field "□" is connected to the "Σ" via the link "-", the routine determines association of the "□" with the "Σ." Without a link "-", it finds out a field "□" that is associated with the "Σ" according to default association criteria.

Figure 31:
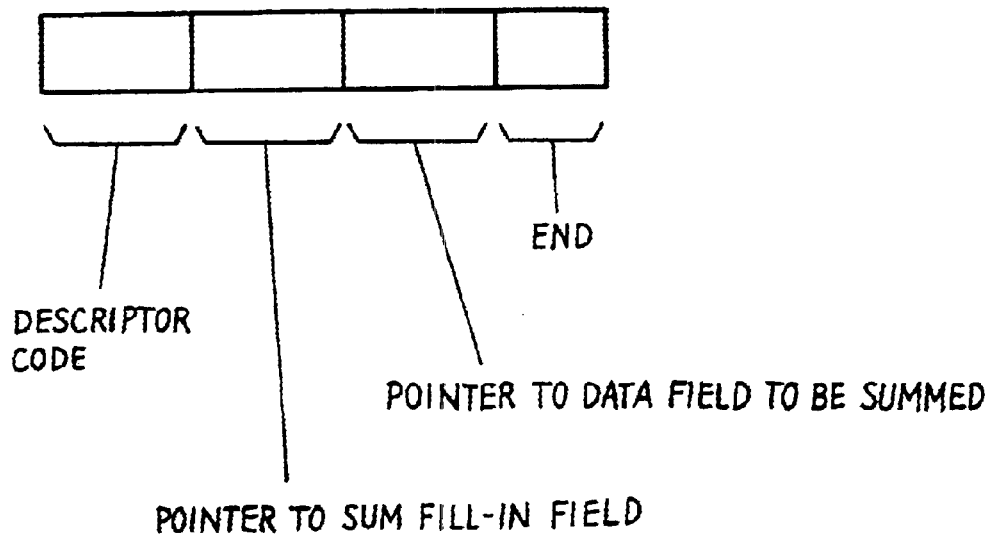
FIG. 31 shows a data format of a sum descriptor record in accordance with the embodiment system.

FIG. 31 shows a sum descriptor record data format. In FIG. 9, in the bottom cell of the quantity field, a blue colored search dictionary written sign "○" encloses a sum written sign "Σ." A blue colored field written sign "□" is located next to the "Σ" mark. In this case, the pointer to sum fill-in field in the descriptor record is set to a pointer specifying the address of the document element records storing the blue colored field written sign "□" located next right to the "Σ" mark. The pointer to a data field to be summed in the sum descriptor record is set so as to point to the field descriptor record of the "QUANTITY" field since the "QUANTITY" field is a field to which the written sign "Σ" pertains.

In the "PRICE" column, a blue colored "SEARCH DICTIONARY" written sign "○" encloses a written sign "¥." In this case, the document element record of the written sign "¥" is found and matched against the application dictionary 52, so that the written sign "¥" is identified as a unit name command. Thus system executes a create unit descriptors routine.

The create unit descriptors routine searches for a field to which the unit is applied. To this end, the routine sequentially examines locations of the unit name character string (or character), field mark "□" and data item name character string written sign. If the unit name character string is located in a field "□", the unit specified by the unit name character string is considered field unit attribute of that field "□." If a tabular cell includes a data item name as well as the unit name character string, the unit is considered field unit attribute of the field "□" of that data item name. This is the case of "¥" in the <PRICE> cell and "K¥" in the <SALES> cell. If the unit name character string is connected to a field "□" or a data item character string via a link "-", the unit is considered as the field unit attribute of that field "□" or the field "□" of that data item character string.

Having determined the field that is associated with the unit written mark the system picks up the field descriptor (FIG. 26) of that field and writes the unit code into the field descriptor record as unit attribute thereof.

Unlike arithmetic descriptor or sum descriptor, the unit descriptor does not constitute an independent descriptor record. The unit descriptor is incorporated into a field descriptor record of a field 5c (to which the unit is applied) as part thereof, specifically as a field unit attribute thereof.

The description now turns to creating descriptor records pertaining to the "FORMAT DOCUMENT" group.

At first, the system retrieves, from the descriptor element file storage 44, those descriptor element records pertaining to "FORMAT DOCUMENT" group sequentially and identifies them. The retrieved descriptor element record's pointer is used to retrieve a document element record corresponding thereto from the document element file storage 38. Each "FORMAT DOCUMENT" descriptor written sign is analyzed to find the object and domain.

For object identification, from an object marking descriptor element "><", the system searches through the document element file data for a character string or graphical located between the written signs ">" and "<". The found character string or graphical is determined as the object of the written signs. The system also searches for a character (character string) or graphicals that is connected to a "FORMAT DOCUMENT" written sign via a link "-", or located in the vicinity of the format document written sign. The character string or graphical, thus found, is identified as the object of the format-document written sign.

For domain identification, the system searches for ①margin or tab, ②field and ③tabular cell in this priority order of domain which is connected to the format-document written sign via a link "-" or includes that document-format written sign. When a margin or tab is found, the margin or tab is identified as domain of the format-document written sign even if the format-document written sign is located in a field or tabular cell at the same time. In the case when no margin or tab is found but a field including the format-document written sign is found, that field is identified as the domain of the format-document written sign even if the format-document written sign is located within a tabular cell at the same time.

The descriptors pertaining to the format-document group are classified into "DOMAIN DESCRIPTOR" class, such as "TAB" and "MARGIN", for specifying domain of a document and/or writings and "LAYOUT DESCRIPTOR" class, such as "CENTERING" and "RIGHT JUSTIFICATION", for specifying layout of written signs and/or writing. The "LAYOUT DESCRIPTOR" class is further subdivided into those descriptors for layout of an already entered written items and those for layout of a to-be-entered writing.

Figure 32:
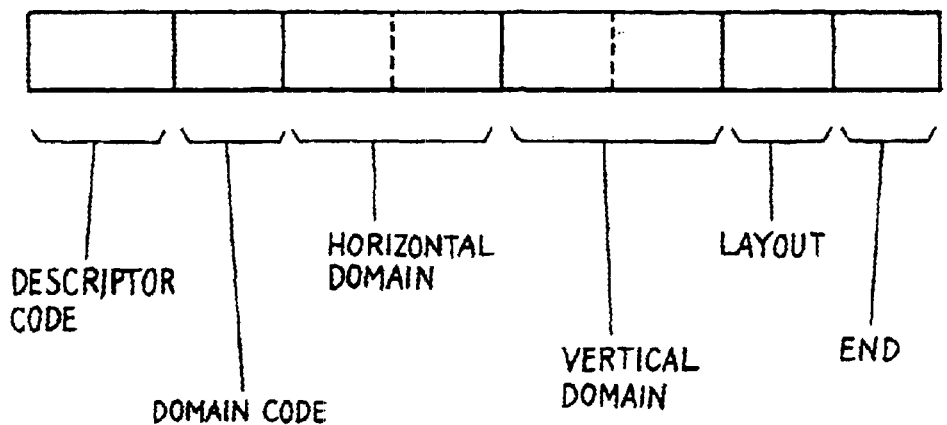
FIG. 32 shows a data format of a domain descriptor record in accordance with the embodiment system.

The system represents the object and domain identified for each written sign as follows. According to the data format shown in FIG. 32, a domain descriptor record includes a domain code such as margin or tab code and horizontal and vertical domain data fields specifying the domain such as margin or tab location.

Figure 33:
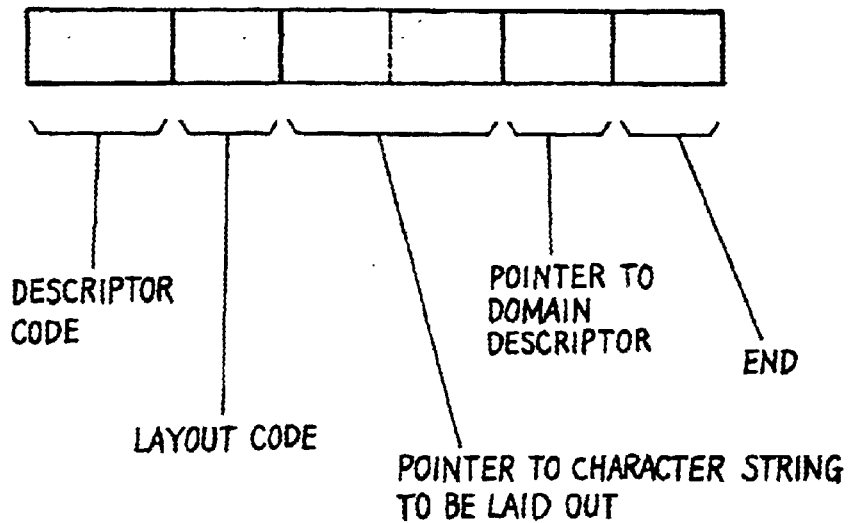
FIG. 33 shows a data format of a layout descriptor record in accordance with the embodiment system.

According to the data format shown in FIG. 33, a layout descriptor record pertaining to the "LAYOUT" descriptor class for specifying layout of existent object (characters, graphical) is created for each layout specifying written sign. The layout descriptor record includes object and domain pointers. The object pointer points to a document element record storing characters and/or graphical as object. The domain pointer points to a field descriptor record (FIG. 26), cell data record (FIG. 20) or domain descriptor record (FIG. 32), corresponding to the domain which is a field, cell or tab (margin).

For representation of the layout descriptor class for specifying layout of nonexistent object, the system stores the layout code into the layout data field of a field descriptor record (FIG. 26), cell record (FIG. 20) or domain descriptor record (FIG. 32) corresponding to field, sales, or tab (margin) as the domain of the layout written sign. Since the field descriptor records have been completed in the create manage document descriptors routine, storing layout code into the field descriptors is skipped at this time.

The object of a descriptor pertaining to the "EDIT DOCUMENT" group is also identified in a similar manner by retrieving an "EDIT-DOCUMENT" descriptor element and corresponding written sign (=, V, → etc.,) and searching for associated written signs that are located in the vicinity of the edit-document descriptor written sign or connected thereto via a link while exploring through the document element file, as done in the object identification of the "FORMAT-DOCUMENT" descriptor written sign.

Figure 34:
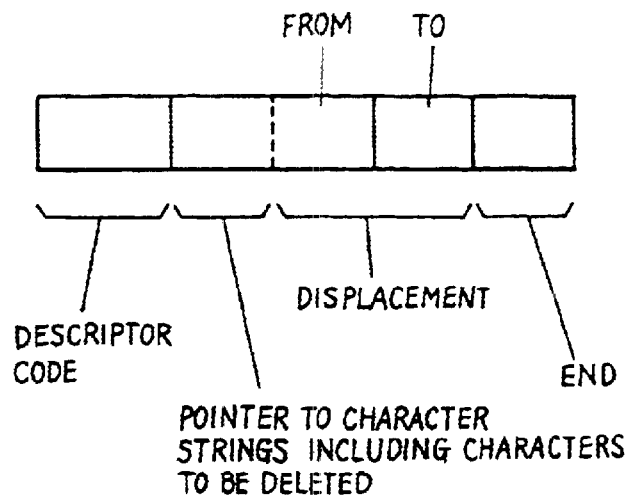
FIG. 34 shows a data format of a delete descriptor record in accordance with the embodiment system.
Figure 35:
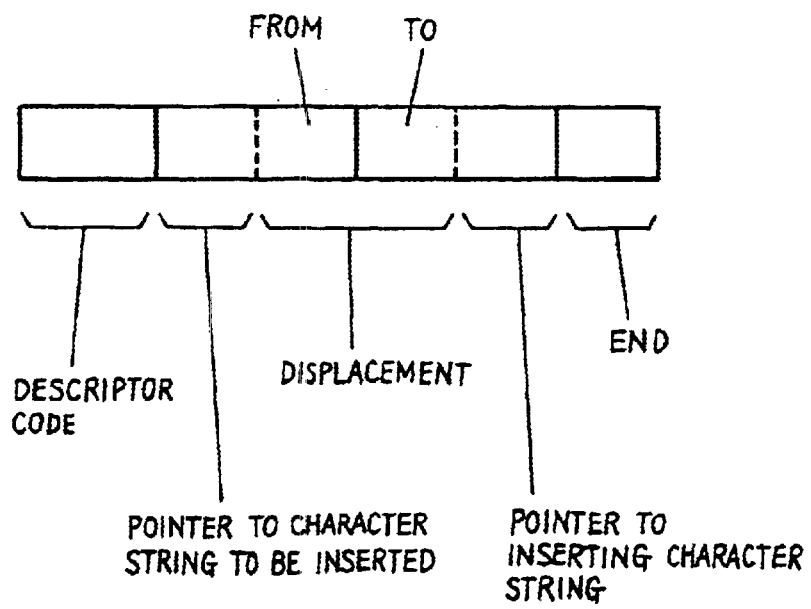
FIG. 35 shows a data format of an insert descriptor record in accordance with the embodiment system.
Figure 36:
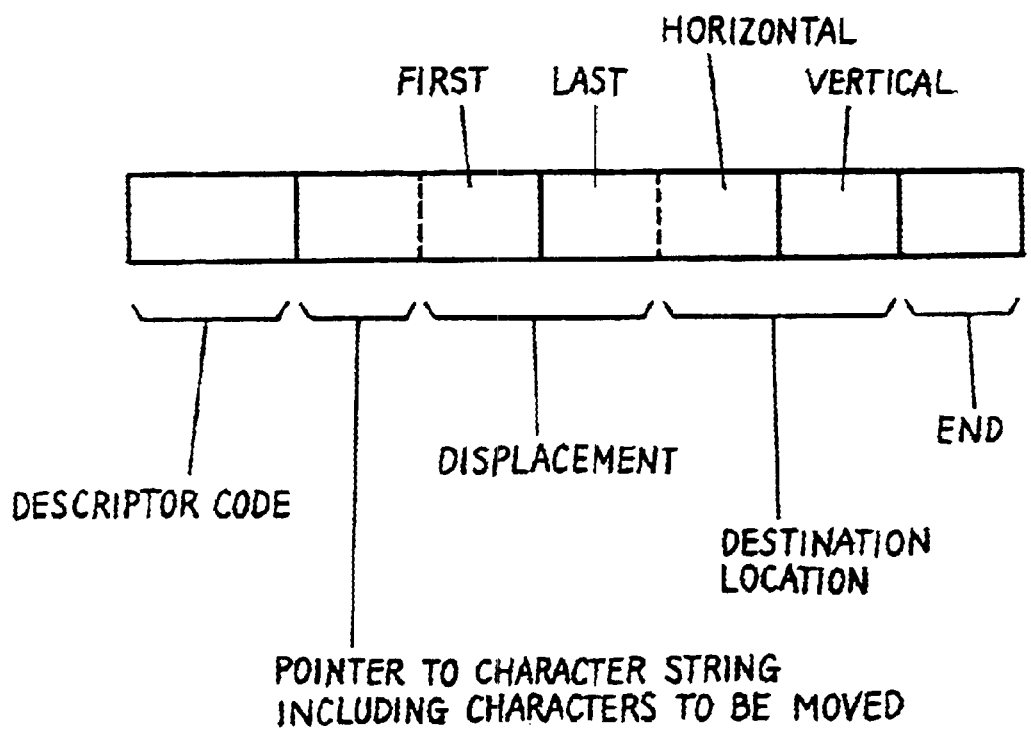
FIG. 36 shows a data format of a move descriptor record in accordance with the embodiment system.

FIGS. 34 to 36 show a data format of delete descriptor record, insert descriptor record, and move descriptor record, respectively, as examples of edit-document descriptor.

In FIG. 34, the delete descriptor record includes a pointer to the object (i.e., character string including characters to be deleted) and a pointer (displacement) specifying those characters in the string which is written over by a delete descriptor written sign "=" and is thus to be deleted. The to-be-deleted characters are pointed to by the first and last characters thereof. In the title "SALES LEDGER" in FIG. 9, the "LEDGER" is written over by a delete written sign "=". In this case the character string "LEDGER" is to be deleted. If a delete written sign "=" covers a single character, the single character is identified as the character to be deleted so that the pointer (displacement) to the first and last characters in the delete descriptor record points to the same and single character to be deleted.

In FIG. 35, the insert descriptor record has a pointer to an object character string to be inserted and a pointer (displacement) specifying the characters in the string between which the insert descriptor written sign "V" has been entered. In the case of "SALES LEDGER" shown in FIG. 10, the pointer (displacement) points to the last letter "S" of "SALES" and the first letter "L" in the "LEDGER." The insert descriptor record further include a pointer to an inserting character string which is "GENERAL" in the case of FIG. 10.

In FIG. 36, each move descriptor record includes a pointer to an object character string including characters to be moved, a pointer (displacement) specifying those characters in the string to be moved (pointing to the first and last characters thereof) and a pointer to destination location (x, y) specified by the move descriptor written sign "→".

In this manner, all descriptor records including data-managing and formatting document descriptors have been created from the source document with descriptor written signs, such as one shown in FIG. 9. The descriptor records are classified according to groups of "MANAGE-DOCUMENT", "FORMAT-DOCUMENT" and "EDIT-DOCUMENT" and are stored into the manage-document file storage 54, format-document file storage 56 and the edit-document file 58, respectively.

In the above example, the source document writings are entered using the color image scanner. Other input equipment, such as keyboard 12, mouse 14 and digitizer 15, can be used to enter the source document writings. The writing information entered by the keyboard 12 is received by the input characters and graphical elements block 37 (FIG. 11) which directly creates document elements without requiring-recognition of characters and graphicals. The writing information entered by mouse 14 and/or digitizer 15 is received by the input characters and graphicals element block 37 and is analyzed by the recognize characters and graphicals block 34. The block 34 repeatedly recognizes characters and/or graphicals for each entered writing information piece, thus creating a document element file.

Figure 37:
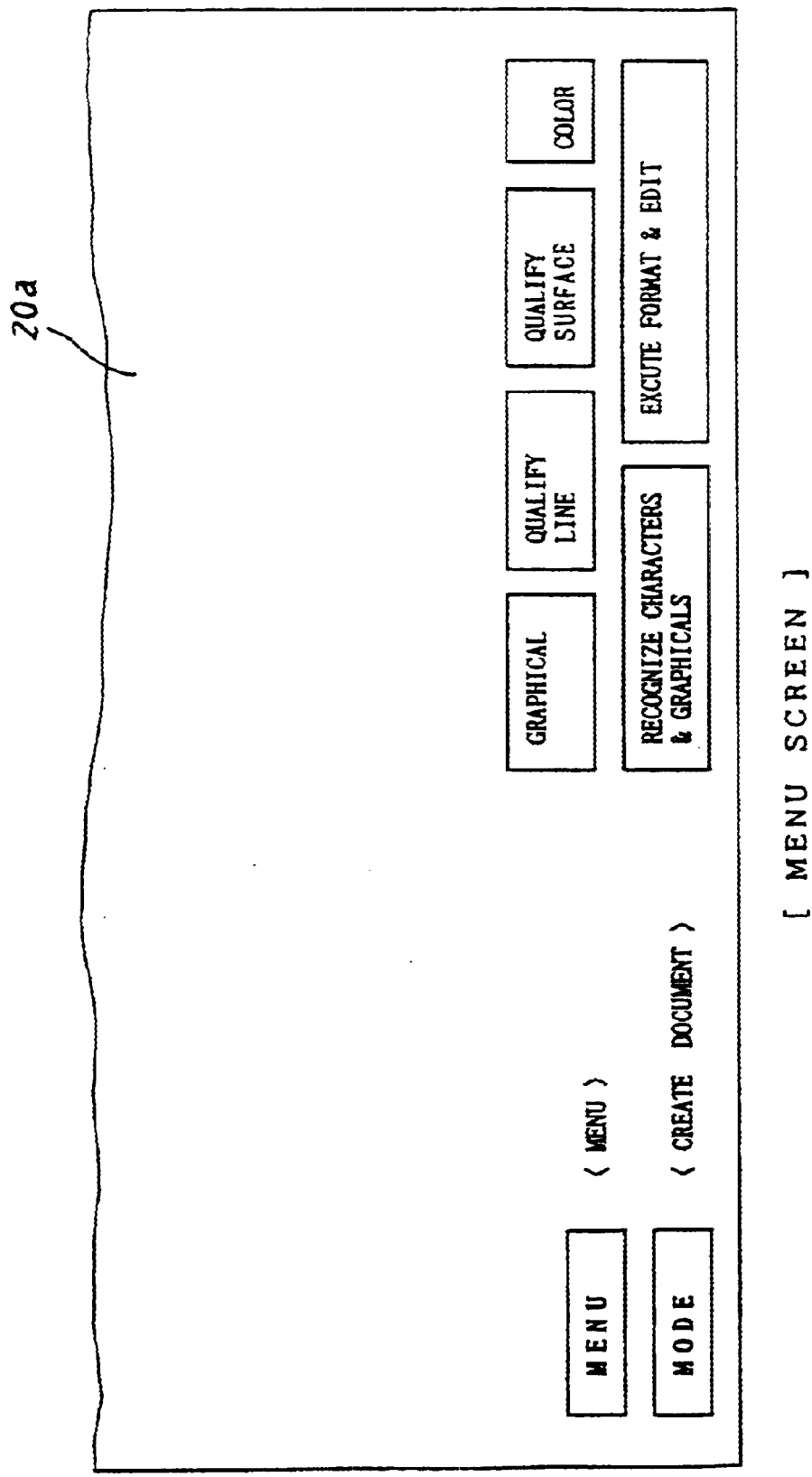
FIG. 37 is a view of a create document menu screen in accordance with the embodiment system.

The display-driven system of input equipment 12, 14 and 15 enters descriptor written signs as follows. The user selects from the screen 20a the "MENU" button which always appears on the bottom left of the screen 20a. This switches the screen to a "MENU SCREEN" shown in FIG. 37. The menu screen presents "GRAPHICAL", "QUALIFY LINE" "QUALIFY SURFACE", "COLOR" buttons at bottom right of the screen each for invoking a corresponding menu-driven data entering feature. For example selecting "COLOR" button changes the screen to a "COLOR MENU" screen shown in FIG. 38. Then, selecting "RED" button from the color menu screen causes the system to operate in the "RED" mode in which all written sign entries of characters and graphicals are labeled with or qualified by a red color and are displayed in red on the screen. In a similar manner, any writing entries may be qualified by "BLUE" "GREEN" or the like.

With the display-driven feature, the user can color-qualify any writing entries any time, before or after the entering. For example, before entering characters or ruled lines, the user may call the color menu screen to select desired color button in the color menu. In the alternative, the user may specify the desired portion of the writing entries that have been entered in a standard color and then select a desired color button.

When a written sign has been entered from the display screen, the input characters and graphicals elements block 37 (FIG. 11) creates or changes document element data based on data of a written sign each time it is entered.

Like the sheet carried writings entered as an image, the writing information (character string, mark, graphical) entered from the display screen is represented by document element records (FIGS. 15 to 19) in the system. For example, when a color command is entered in the color menu mode, the selected color code is set into the appropriate document element records.

It is practically advantageous to use the display-driven entering system together with the image entering system. Since within the system the writing information entered via the document image and writing information entered by commands from display screen are commonly represented in the form of document element records, either the image entering system or the display-driven entering system can be used to enter desired written signs or symbols any time whether it is an original document writing (ordinary written item) or an additional written sign for a descriptor. Therefore, the user may first enter a source document with basic document writings only, such as the one shown in FIG. 8. Then, while confirming the source document presented on the display screen 20a, the user may enter desired writing information pieces, in particular those written signs for descriptors to be added to the displayed source document by operating keyboard 12, mouse 14 and/or digitizer 15.

In another entering procedure, the user may first enter by the image scanner all writings of the source document, such as one shown in FIG. 9 without distinguishing ordinary written items and written signs for descriptors, all having a standard color (e.g., black). Then, from the displayed source document on the screen 20a, the user may designate written signs for descriptors by commands from keyboard 12 and/or mouse 14 and qualify them with suitable attributes (e.g., color).

In still another procedure of entering, the user may enter or add written signs for descriptors by inputting commands from the displayed screen to the source document that has been entered by the image scanner. For example, at first, the source document with basic writings thereon, such as the one shown in FIG. 8, is read by the image scanner 10. Then the system displays the contents of the entered source document on the display screen 20a, as shown in FIG. 53. From the screen, the user enters commands to specify descriptors using the keyboard 12 and/or mouse 14.

In the "DEFINE" mode, the user may select and click an item "QUANTITY" (as an ordinary written item) in the displayed source document shown in FIG. 53. This causes the selected area 90 to be displayed in a specific fashion (for example displayed in reverse) and a window 94 including a list of descriptor elements such as 1.field, 2.data item, 3.unit, etc., appears on the display screen 20a. Then, the user may select "2. DATA ITEM". This converts the ordinary written item "QUANTITY" to the descriptor element of data item "QUANTITY." An area 92 below "QUANTITY" cell may be clicked and designated as "1.FIELD." Then, system identifies the area 92 as the field in which data of "QUANTITY" are to be filled. Similarly, an ordinary written item of arithmetic formula "SALES=PRICE×QUANTITY" may be converted into a data-managing descriptor which specifies the arithmetic formula.

For the sake of description, FIG. 53 shows as if both "QUANTITY" cell domain 90 and the field domain 92 were selected at once. In fact, they are selected or clicked one by one.

The system reads a command entered by the user in the manner as described, locates and picks up in the element document file storage 38 a document element record corresponding to the document element that is clicked on the screen and creates a required descriptor record from the picked document element record and the entered command.

The user may also change or cancel an already entered descriptor by entering an edit-document command from the screen while marking the descriptor written sign to be edited.

Figure 39:
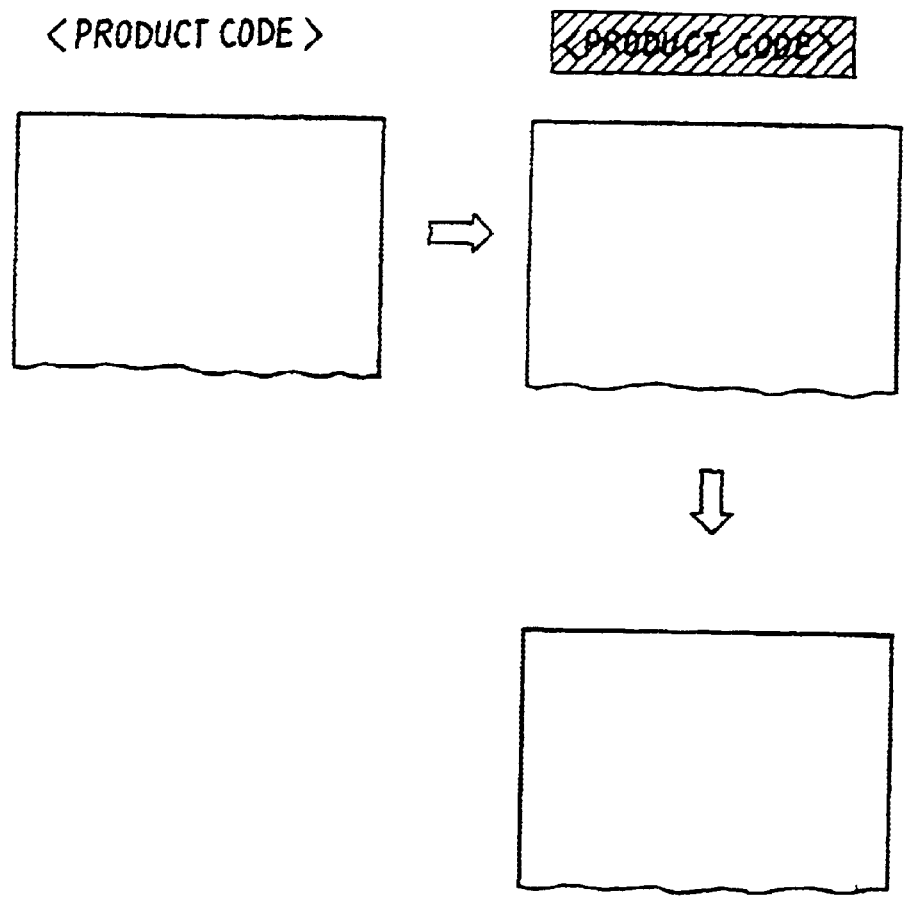
FIG. 39 illustrates how an already entered descriptor written sign is changed or deleted using a display-driven edit-document feature in accordance with the embodiment system.
Figure 40:
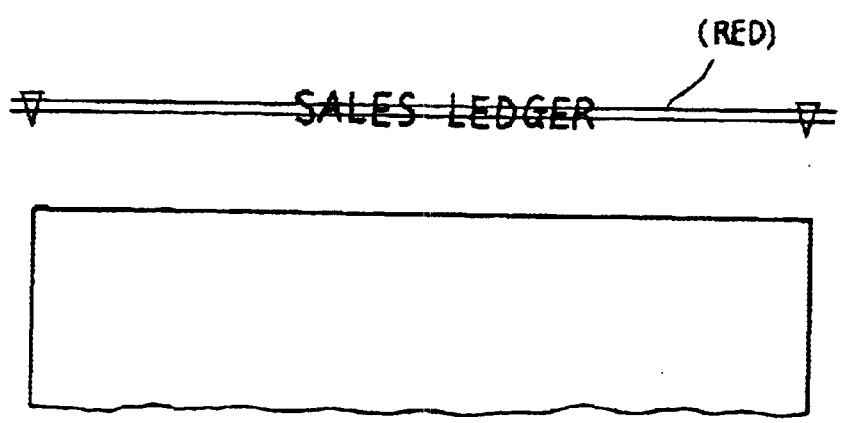
FIG. 40 schematically illustrates how a descriptor written sign is changed or deleted by executing an edit-document descriptor which designates the descriptor written sign as an object to be edited in accordance with the embodiment system.

An example is shown in FIG. 39. A written sign of "<" product code ">" has been entered as a data-managing data item descriptor. Entering an edit-document command of "DELETE" for the written sign "<PRODUCT CODE>" results in cancelling the data item descriptor "PRODUCE CODE" from the document. To this end, the system reads the entered command "DELETE", explores through the document element file storage 38 to locate and pick up a group of document element records forming the descriptor written sign "< >" that is clicked on the screen, picks up a descriptor element record and descriptor corresponding to the written sign "< >" and deletes them from the descriptor element file storage 44 and manage-document file storage 54.

The user may enter a command of "MOVE" or "COPY" on the screen for a format-document descriptor written sign entered in a field, for example, "C" for centering. This results in change or extension of descriptor object. To this end, the system reads the entered command "MOVE" or "COPY" and picks up data records of the written sign "C." In the case of "MOVE", the system updates the appropriate descriptor element record and descriptor record with respect to location. In the case of "COPY", the system creates a new descriptor element record and descriptor for a written sign "C" to be newly entered written in the destination.

Figure 41:
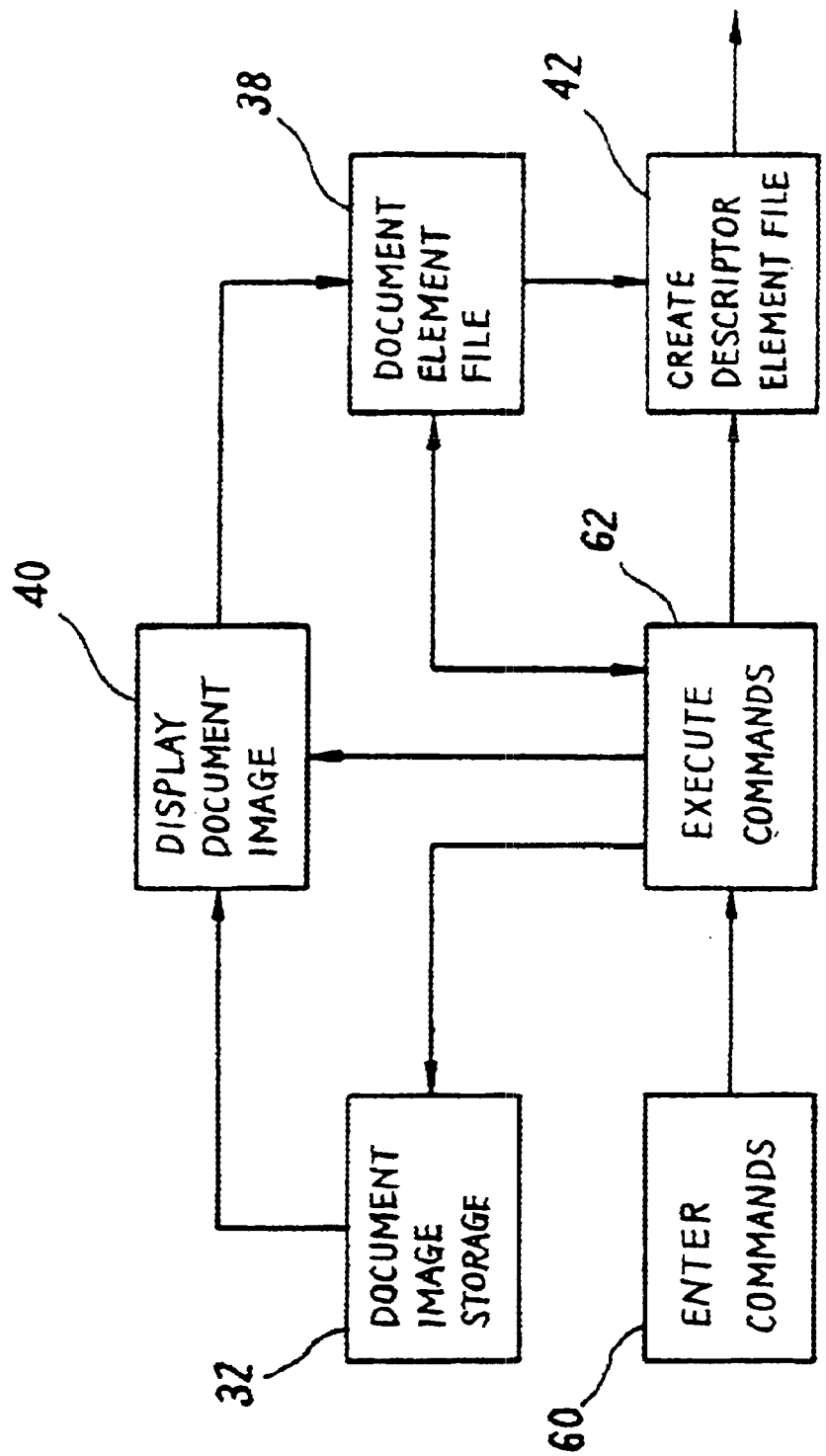
FIG. 41 is a block diagram showing functions of a subsystem in the embodiment for entering written signs and creating descriptors therefrom using a display-driven feature in accordance with the embodiment system.

As stated, entering commands using a display-driven system enables making or updating descriptors. To this end, the system includes an enter commands block 60 and an execute commands block 62 as shown in FIG. 41. The enter commands block 60 receives a command entered by the keyboard 12, mouse 14 and/or digitizer 15. The execute command block 62 makes, updates or cancels a required descriptor by reading the input command and picking records. The enter commands block 60 and execute commands block 62 are implemented by programs for handling entered commands and making a document and CPU 24 which executes the programs.

Using the menu driven system, the user may enter a delete command such that a delete written sign "=" is written over an ordinary written item "SALES LEDGER" and a format-document written sign "∇" for tab to delete the "SALES LEDGER" and "tab" descriptor written sign of "□." To this end, when executing edit-document descriptor commands (to be described), the system deletes, from the document element storage file 38, a document element record of the ordinary written item "SALES LEADER" and deletes a document element record, descriptor element record and a format-document descriptor each corresponding to the descriptor written sign "□" from the document element file storage 38, descriptor element file storage 44 and manage-document file storage 54, respectively.

In this manner, the system processes writings and written signs of source document, such as characters, symbols, and graphicals, into document element records, descriptor element records and finally descriptor records to thereby define required document data management and document format.

Figure 38:
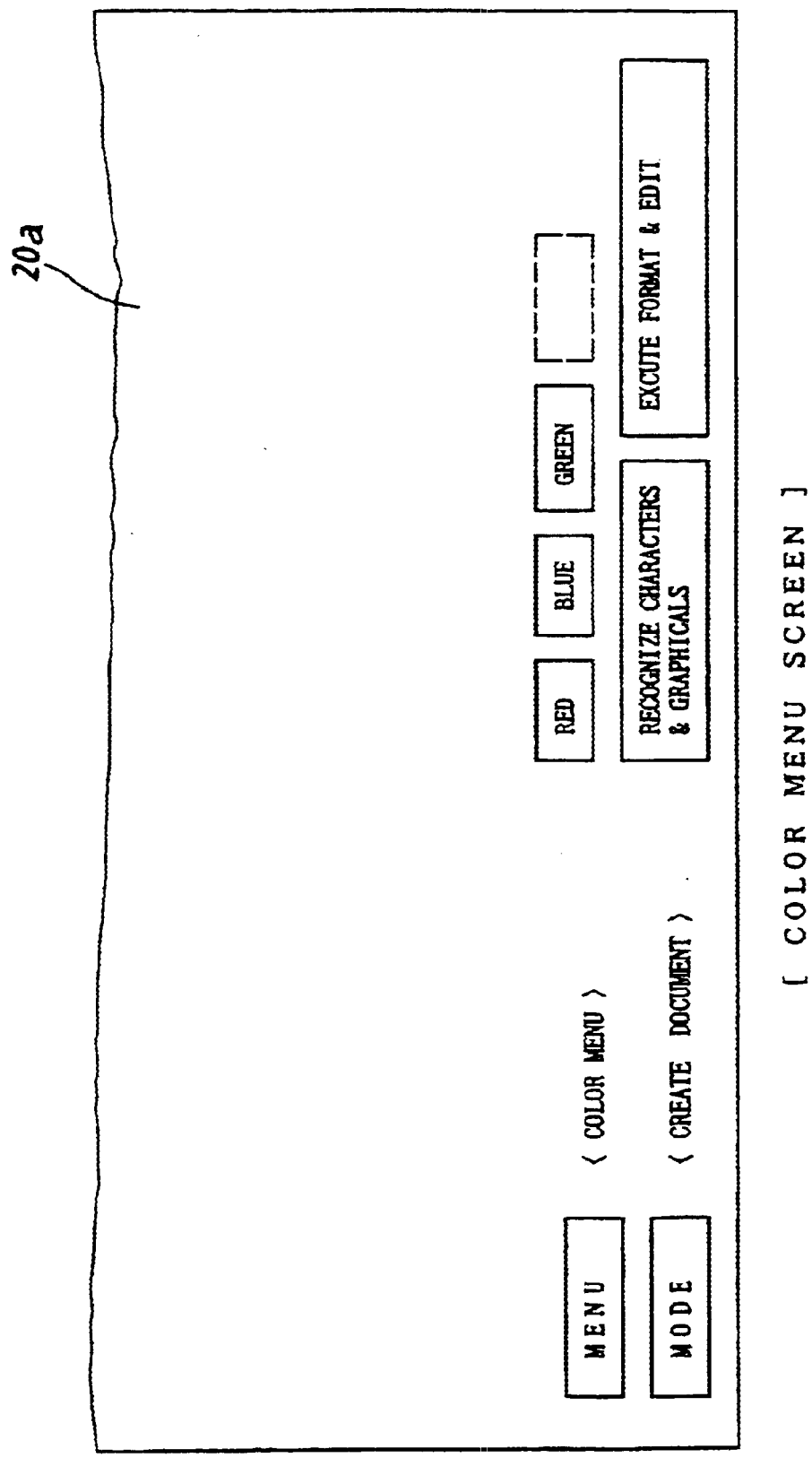
FIG. 38 is a view of a color menu screen in accordance with the embodiment system.
Figure 42:
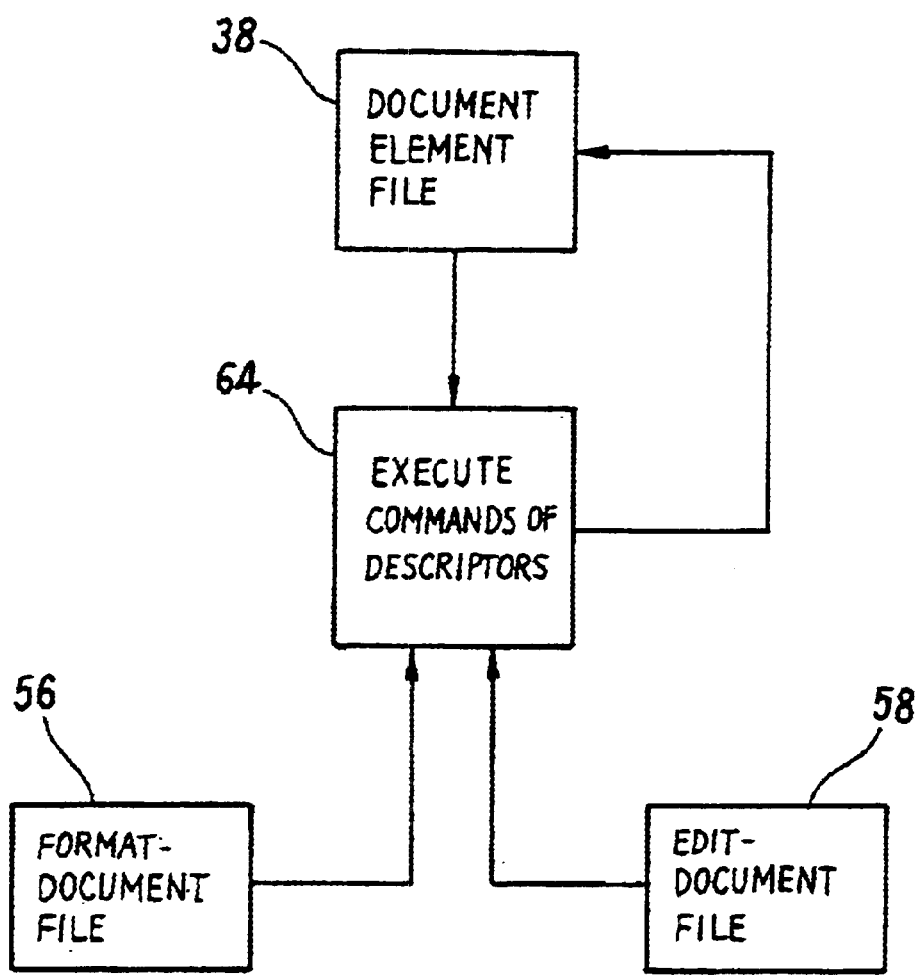
FIG. 42 is a block diagram showing functions of a subsystem in the embodiment for executing format-document and edit-document descriptors in response to an input command in accordance with the embodiment system.

It is desirable at this time to execute commands of format-document descriptors and edit-document descriptors to specify the format of document for those characters, character strings etc., already entered in the document. These descriptor commands are executed by an executed commands of descriptors block 64 in FIG. 42 in a response to an input command from the user. For example, the execute of descriptor commands is invoked when the "EXECUTE FORMAT EDIT" button on the screen of FIG. 38 is clicked. The execute commands of descriptors block 64 is implemented by the program for executing commands of descriptors stored in the internal storage 16 and CPU 24 for running the program.

The execute commands of descriptors block 64 successively retrieves edit-document descriptors from the edit-document file storage 58 and performs required processing (delete, insert, move etc.,) of the required (pointer-specified) object (character strings etc.) according to the retrieved edit-document descriptors. Finally the block 64 updates the document element file storage 38 for those document element records corresponding to the processed object (character strings etc.).

The execute commands of descriptor block 64 executes an "INSERT" descriptor command as follows. The block 64 picks up an insert descriptor record (FIG. 35), uses it to retrieve a character string to be inserted which is "SALES LEDGER" in the case of FIG. 10, locates the insert position in the string (between the last letter "S" of sales and the first letter "L" of ledger) and retrieves an inserting character string ("GENERAL"). Then the block 64 inserts the inserting character string ("GENERAL") into the object character string ("SALES LEDGER") between the last letter "S" of sales and the first letter "L" of ledger, thus making an edited character string ("SALES GENERAL LEDGER") while deleting the characters strings before inserting ("SALES LEDGER" and "GENERAL").

The block 64 executes a format-document descriptor similarly. It retrieves a format-document descriptor from the format-document file storage 56, processes the appropriate (pointer-specified) object (e.g., character string) according to the retrieved format-document descriptor and updates appropriate document element record in the document element file storage 38.

For example, the block 64 executes a centering descriptor corresponding to the blue colored written sign "C" entered in the tabular cell of "PRICE" in the document of FIG. 9 as follows. Using a pointer in the centering descriptor (FIG. 33) corresponding to the written sign "C", the block 64 retrieves a character string "PRICE" which is the red colored ordinary writing entered in the tabular cell and lays out the character string "PRICE" by centering. Finally, the block 64 updates the location data in the document element record (FIG. 16) of the character string "PRICE" to be centered.

Having executed commands of "FORMAT-DOCUMENT" descriptors and "EDIT-DOCUMENT" descriptors, the embodiment system may display the black colored ordinary writings only whereas inhibiting the blue and red written signs for descriptors from the screen. To this end, the display document image block 40 in the system excludes the red or blue colored document element records (FIGS. 15 to 19) from the image objects to be displayed and processes the black colored document element records only into an image signal which is displayed on the screen 20*a* as a monochromatic document image. In the case of FIG. 9, the document image shown in FIG. 43 appears on the screen 20*a*.

The description now turns to a data output function feature of the embodiment system for posting data from a source data file to the electronic document and for outputting the resultant document.

The embodiment system performs the data output process after creating the descriptors or after executing the commands of "EDIT-DOCUMENT" descriptors and "FORMAT-DOCUMENT" descriptors after having created the descriptors. In the alternative, the document requirements data may be saved into an external storage for document file. Then the saved document-requirements data are loaded into the internal storage 16. From the loaded document-requirements data, an electronic document is made and displayed on the screen 20*a* (FIG. 43), then the data output process may be invoked.

Figure 44:
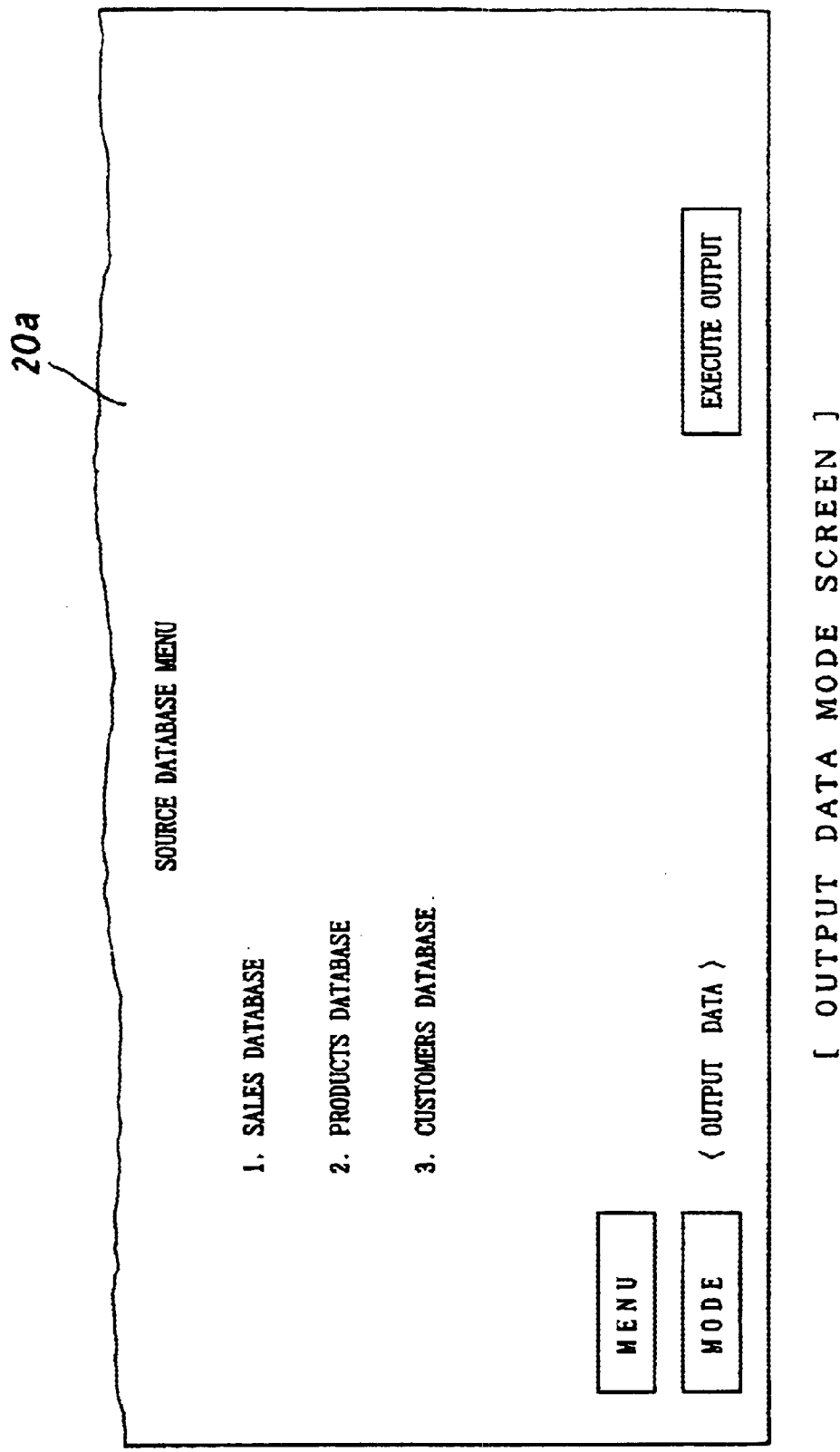
FIG. 44 is a view of an output data mode screen in accordance with the embodiment system.

The data output process is carried out in the mode of "OUTPUT DATA." When the "MODE" button (FIG. 3) on the screen 20*a* is clicked and "OUTPUT DATA" in the mode menu is selected, the embodiment system enters "OUTPUT DATA" mode, presenting "SOURCE DATABASE MENU" on the screen 20*a* as shown in FIG. 44. Then the user may select a desired database from the menu, for example, in the case of FIG. 9, selects "1.SALES DATABASE" and clicks "EXECUTE OUTPUT" button.

Figure 45:
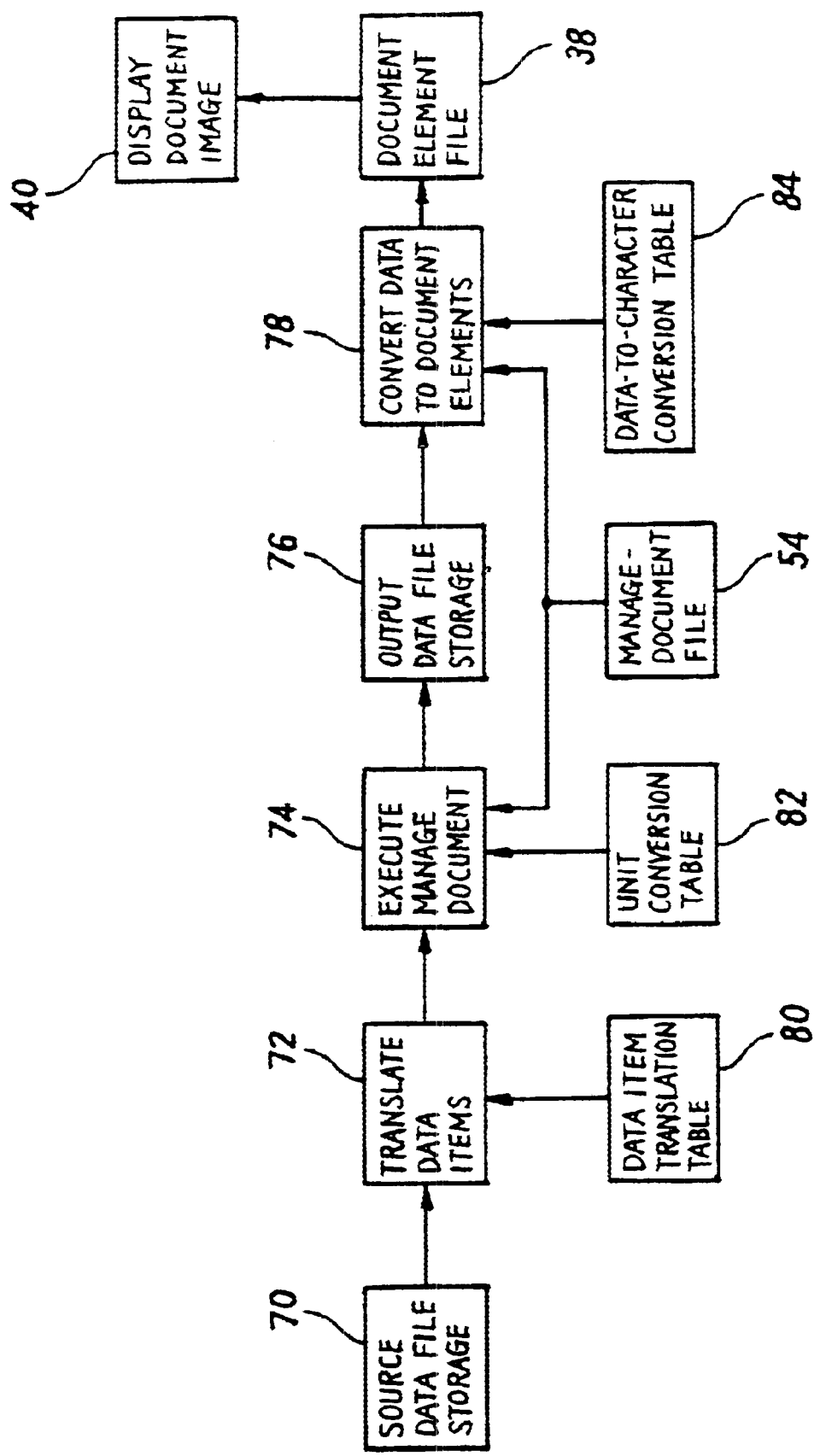
FIG. 45 is a block diagram showing functions of a subsystem in the embodiment for outputting data.

FIG. 45 shows functional organization in the present embodiment system for outputting data. A translate data items block 72, execute manage document block 74 and convert data to document element block 78 are implemented by the required translating and converting program and CPU 24 which runs it. A source data file storage 70, data item translation table 80, output data file storage 76, unit conversion table 82 and data-to-character conversion table 84 may be implemented by the internal storage 16 and/or external storage 18.

At the beginning of the output data process, an external system for managing the source database sends a group of source data records with a file header to the communication interface 26 which stores the received source data into the source data file storage 70. The header describes the data format or structure of the source data.

FIG. 46 illustrates a source data file of "SALES FILE" together with the header thereof. Each data record in the source data file includes data items of "BUN", "HIN", "TAN", etc., defined by the external source database management system. The source data file and the header may be sent separately. The file header may first be sent and stored into the storage in the embodiment system.

Figures 48, 49, 50:
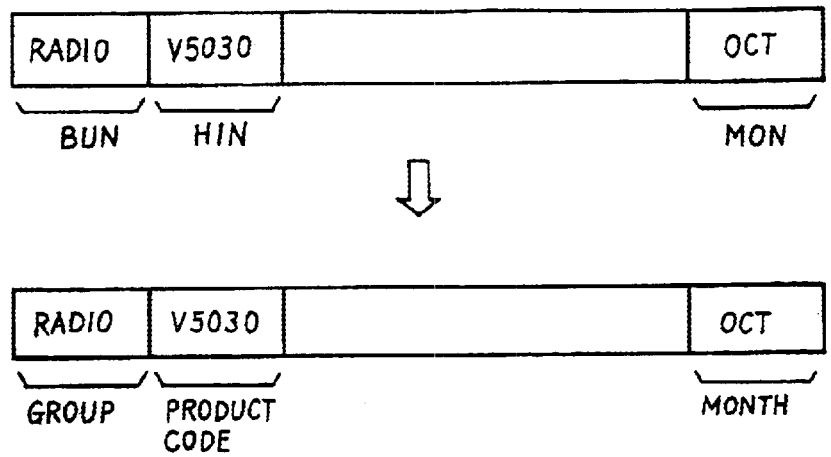
FIG. 48 illustrates how data items in the source file are translated into corresponding data items in the system in accordance with the embodiment system.
FIG. 49 illustrates an array of data records obtained by executing a manage-document descriptor record of "SORT" in accordance with the embodiment system.
FIG. 50 illustrates a data record obtained after executing manage-document descriptors in accordance with the embodiment system.

The translate data items block 72 looks up the data item translation table 80 (FIG. 47) according to which respective data item names in the source data records, such as "BUN", "HIN", "TAN" etc., are translated into data item names "GROUP", "PRODUCT CODE", "PRICE" etc., (see FIG. 48). The source data file record includes a data item of "MAK". Since the data item "MAK" indicates a name of manufacturer that manufactures the product, this data item is excluded from the output data file record.

The execute manage document block 74 receives source data records from the translate data items block 72, identifies those data records of a particular month, for example, October and data-manages them according to the manage-document file 54 storing manage-document descriptors, such as field descriptors, sort descriptor, arithmetic descriptor, etc.

In the case of the document of FIG. 9, the system performs data managing process as follows. According to the arithmetic descriptor (FIG. 30), the system carries out the arithmetic operation of "<SALES>=<PRICE>× <QUANTITY>" for each data record and set the computed result into the data item of "SALES." Next, according to the sort descriptor (FIG. 27), the system sorts the data records in the sales discreasing order. Then, according to the field descriptors (FIG. 26), data items "PRICE" and "SALES" in each data record are processed so as to have the required significant figures in the required unit of "¥", "K¥" with the required rounding. As a result, each file record meets the required data format, as shown in FIG. 50. Having processed the data records according to manage-document descriptors, the execute manage document block 74 stores the resultant records into the output data file storage 76.

Figure 51:
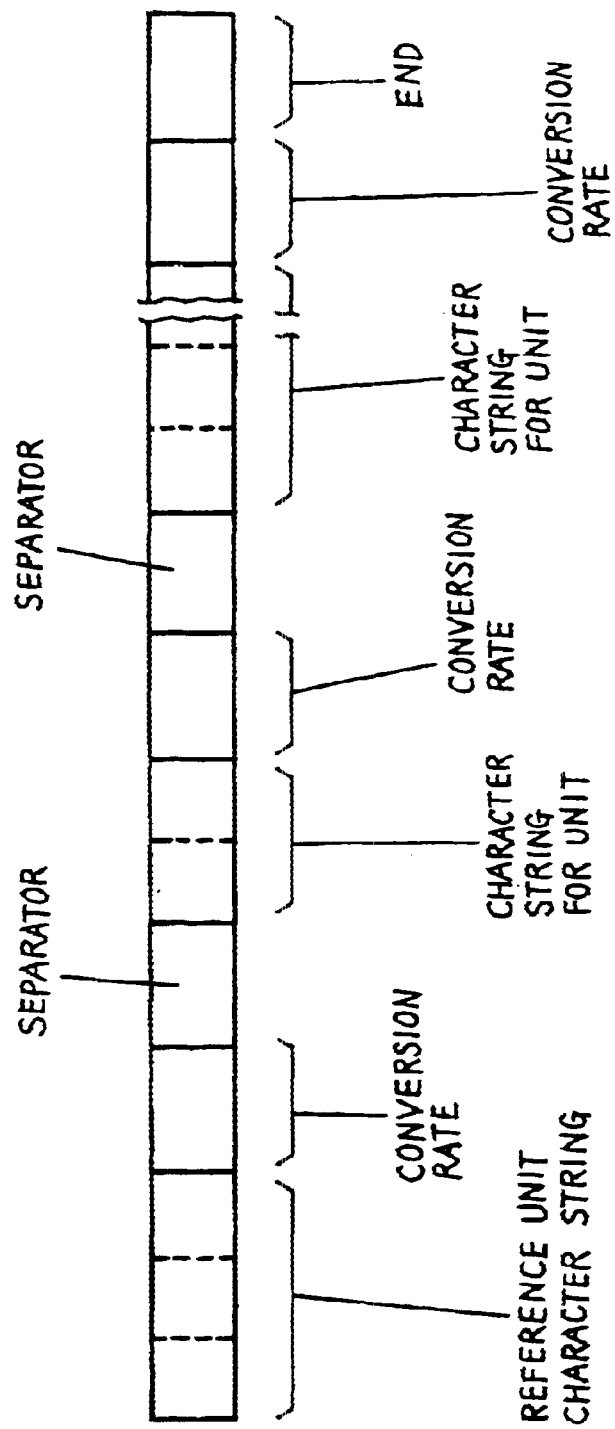
FIG. 51 shows a data format of an unit conversion record in accordance with the embodiment system.

The system looks up the unit conversion table 82, such as the one shown in FIG. 51, to convert the unit of data items in each record. In FIG. 51, the unit conversion record for money starts with a reference unit character string of "¥" which is followed by the conversion rate of "1." Then via a separator, a unit name character string of "YEN" and conversion rate of "1" succeeds. After a second separator, another unit name character string of "K¥" and a corresponding conversion rate of "1000" follows.

The convert data to document element block 78 retrieves from the output data file storage 76 data records and convert each data item in each data record to document element data. In doing so, a product code of, say, "TV" in a data record from the output data file storage 76 is converted into a document element record of character string (FIG. 16) according to which a desired character string "TV" is displayed on the screen at a desired position in the desired output document.

The block 78 looks up the data-to-character conversion table 84 for the required conversion into document element such as character string record (FIG. 16). Further, to determine the location of first character and the character-to-character pitch qualifier, the block 78 looks up the manage-document file storage 54 for layout and pitch data in the field descriptor records. The block 78 also determines other elements in the qualifiers, such as "SIZE", "LINE WIDTH" according to the preselected requirement. In particular, as a color qualifier, black, the color of the ordinary writings, is selected.

The document element records from the convert data to document element block 78 are stored into the document element file storage 38 together with those document element records created in the "CREATE DOCUMENT" or "DEFINE" mode. Thus, the display document image block 40 retrieves from the document element file storage 38 all document element records having the color attribute of black of the 25 ordinary writings and converts them into an image frame of an output document so that an output document image, such as the one shown in FIG. 52, appears on the screen 20a. The output document may readily be printed out by the printer 22 when required.

In this manner, a desired output document is created from a source data file and displayed by the process of output data. Conversely, the output document data may be used to enter data into the source file.

In the above example, to distinguish written signs for descriptors from ordinary writings on a source document and/or to distinguish a different groups of descriptor written signs from each other, the user color-qualifies them in the "CREATE DOCUMENT" mode, in particular "SPECIFY DESCRIPTOR GROUP ATTRIBUTE" mode (FIG. 21) in which the user color qualifies respective descriptor groups.

However, for descriptor group qualification, other attributes such as "LINE TYPE", "LINE WIDTH", "HAND WRITTEN/PRINTED" etc., may be used, as shown in FIG. 21. In the case of "LINE TYPE", the user may qualify ordinary writings by "SOLID" line and qualify written signs for descriptors a broken line, for example, "DOTTED" line for manage-document group and "ALTERNATE LONG AND SHORT DASH LINE" for "FORMAT-DOCUMENT" group. In this connection, the system analyzes the line strokes, finds a generally regular discontinuous of the line strokes for broken line recognition and identifies the type of the broken line by analyzing the interrupting and/or pitch pattern.

For descriptor group qualification by "LINE WIDTH" or weight, the user may qualify the ordinary writings by writing with a pencil and qualify written signs for descriptors by writing with a felt-tip pen. In this case, the line stroke analyzer in the system evaluate the width of a line as measured in a direction normal to the stroke trace and compares it with a reference for line width classification.

In the case of "HAND-WRITTEN/PRINTED", the user may qualify ordinary writings by the printed and qualify written signs for descriptors by the hand-written entries. The system distinguishes the handwritten entries from the printed entries as follows. For graphicals such as circle, line, etc., the system evaluates the stroke trace direction or angle to determine whether it is handwritten or printed. For characters, the system checks character size variation between adjacent characters or compares a location and proportion of character constituent strokes with those of a standard printed character and based on the comparison error determines whether it is handwritten or printed.

In the above example, the user has assigned a blue color to the "MANAGE-DOCUMENT" group written signs, and a red color to the "FORMAT-DOCUMENT" group written signs and "EDIT-DOCUMENT" group written signs for color-qualification of respective descriptor groups. This makes it easy for the system to identify a descriptor group to which a written sign pertains to. In addition, a common written sign, such as link written sign "→" is employed for different descriptor groups (FIGS. 5 and 6). However, in a unique descriptor element definition scheme in which each descriptor element is uniquely defined by a unique written sign, there is no need to differently specify qualifiers of the "MANAGE-DOCUMENT" group and those of the "FORMAT-DOCUMENT" group. In the alternative, any desired combination of qualifiers, such as color, line width, line type, etc., may be employed to distinguish descriptor groups from one another or from the ordinary writings. For example, an original document is colored so that descriptor written signs cannot be qualified by color. In such a case, the user may pick up desired attributes such as "LINE TYPE" and "LINE WIDTH" for descriptor group qualification, as shown in FIG. 54.

In this manner, the user can easily specify attributes of written signs for respective descriptor groups by entering a plurality of qualifiers thereof. The entered results are held in the system as attribute specifying records for respective descriptor groups (FIG. 22) which are used to identify a descriptor group to which a written sign pertains by comparing qualifying records (e.g., "LINE TYPE", "LINE WIDTH" in the case of FIG. 54) with the attributes of the written signs.

In the above example, the original writings (ordinary writings) in a source document sheet (FIG. 8) were handwritten. The document image including the black colored ordinary writings is read by image scanner 10 and is analyzed by the recognize characters and graphicals block 34 (FIG. 11) for recognition of document elements. When it has recognized characters and/or graphicals, the block 34 adjusts or normalizes them with respect to their location, size, shape, etc. For a source document in which the ordinary writings have been printed, the recognized characters and graphicals block 34 may use a simplified pattern recognition.

Unlike the handwritten source document, a printed source document is formed by normalized written items (in particular ruled lines) with respect to size, location etc. In this case, the recognize characters and graphicals block 34 may recognize those characters and graphicals only with respect to blue or red colored written signs for descriptors and those ordinary written items associated with the descriptor written signs such as those marked by descriptor written signs of "< >", "○" etc. This recognition process is called when the "RECOGNIZE ASSOCIATIONS" in the defined menu is selected in the "DEFINE" mode after the source document image has been read.

As a result, the document element file storage 38 stores document element records covering all written signs for descriptors having a blue or red color attribute, those document element records of ordinary writings which are associated with the written signs for descriptors, those document element records (if any) which are subsequently entered on a display-driven system and those document element records which correspond to data of respective data items to be filled in document tabular cells. Most of the image-entered, black colored ordinary writings are not transformed into document element records but are stored in the document image storage 32 as image per se.

For outputting a desired document with data, the display document image block 40 retrieves from the document image storage 32 the image of ordinary writings that has not been processed in the characters/graphicals recognition and displays such ordinary writings on the screen 20a in normalized size and location as in the source document. At the same time, the display document image block 40 retrieves from the document element file storage 32 the document element records covering the black colored written items, converts them into an image and superimposes it on the screen 20a in such a manner that such written items have a normalized size and are located at normalized positions, as specified by the descriptors. As the result of the superimposition, a desired document image output (or print out thereof) similar to the one shown in FIG. 52 can be obtained.

In the above example, to distinguish written signs for descriptors from ordinary writings or distinguish written signs in a descriptor group from written signs in any other descriptor group, qualifiers such as color, line type and/or line width of written signs have been employed. However, in a simplified descriptor system in which no duplication exists between written signs for descriptors and ordinary writings, there is no need for qualifying written signs for descriptors by specifying attributes thereof. In such a case, the system looks up only descriptors/written sign table (FIGS. 5 and 6) to determine a descriptor element from a document element (characters, symbols etc.) without referencing any descriptor group attribute specifier (FIG. 22).

Whereas the above embodiment has been applied to composing a tabular document according to manage-document and format-document descriptors, the invention can also be applied to making any document which is to be formatted, data-managed and/or edited.

The invention uses programs or software for implementing the features of the invention. The software may be installed in a system of the invention by any medium with which the software is recorded or by an on-line system. Therefore, selling a medium in which the software of the invention is recorded or installing the software into a system on an on-line basis without authority may constitute practice of the invention.

I claim:

1. A method for use in an information processing apparatus for data managing with a document, said method comprising:

entering first written signs in the form of characters, symbols, and/or graphicals additionally written in a source document such that an attribute of the first written signs is distinct from that of an ordinary writing in the source document, the entered first written signs specifying a data item name and a field with a desired field attribute and a desired field format at a desired location in predetermined rules so that a combination of the data item name and the field defines a first descriptor indicating that one or more data values of the data item are to be filled in the field with the desired field attribute and the desired field format;

wherein the source document is unrestricted by rules applicable to the entered first written signs;

wherein the first written signs comprise a first descriptor element for designating, as the data item name, a character or character string that is originally written to be literally representative of the data item as an ordinary writing in the source document; and wherein the first written signs comprise another descriptor element having its written position indicating a location or boundary of the field in the source document;

recognizing the first descriptor on a basis of the entered first written signs to produce a corresponding first descriptor record;

fetching a data record containing a data value of the data item name from a source data file;

converting the data value of the data item name in the data record to a corresponding document element in accordance with the first descriptor record; and outputting writings of the document element so as to be filled in the field specified by the first descriptor record in the output document.

2. The method of claim 1, further comprising:

entering second written signs in the form of characters, symbols, and/or graphicals additionally written in a source document, the entered second written signs specifying a unit relating to the field in predetermined rules so that a combination of the unit and the field defines a second descriptor associated with the first descriptor, the second descriptor indicating that one or more numerical data values of the data item to be filled in the field of the data item name are to be expressed in the unit;

wherein the second written signs comprise a second descriptor element for designating, as the unit name, a character, character string, or symbol literally representative of the unit as an ordinary writing and for requesting searching in a dictionary for the unit name registered to specify the descriptor content;

recognizing the second descriptor on a basis of the entered second written signs to produce a corresponding second descriptor record combined with the first descriptor record; and converting the unit of the data item name in the data record to the unit specified by the second descriptor record.

3. The method of claim 1, further comprising:

entering third written signs in the form of characters, symbols, and/or graphicals additionally written in a source document, the entered third written signs specifying an arithmetic formula including the data item name as an operand and one or more operators in predetermined rules so that the arithmetic formula is qualified as a third descriptor indicating that an arithmetic operation is to be performed in accordance with the arithmetic formula;

wherein the third written signs include the same pattern of written signs to designate the data item name in the arithmetic formula as the first descriptor element of the first written signs;

recognizing the third descriptor on a basis of the entered third written signs to produce a corresponding third descriptor record;

carrying out the arithmetic operation for a data value of the data item name in the data record to produce data of the computed result in accordance with the third descriptor record;

converting the data of the computed result to a corresponding document element; and outputting writings of the document element so as to be filled in the field of the corresponding data item name specified by the first descriptor record in the output document.

4. The method of claim 1, wherein the field includes a plurality of tubular cells arranged in a line in each of which a numerical data of the data item name per one data record is to be filled.

5. The method of claim 4, further comprising:

entering fourth written signs in the form of characters, symbols, and/or graphicals additionally written in a source document, the entered fourth written signs specifying a total sum and a total sum field related to the field of the data item name in predetermined rules so that a combination of the total sum and total sum field defines a fourth descriptor associated with the first descriptor, the fourth descriptor indicating that numerical data values of the data item to be filled in the field of the data item name are to be summed and the resultant sum data is to be filled in the total sum field;

wherein the fourth written signs comprise a fourth descriptor element for designating, as the total sum name constituting the fourth descriptor, a character, character string, or symbol literally representative of the total sum as an ordinary writing and for requesting searching in a dictionary for the total sum name registered to specify the descriptor content;

recognizing the fourth descriptor on a basis of the entered fourth written signs to produce a corresponding fourth descriptor record combined with the first descriptor record;

summing up data values of the data item name in data records to obtain a total sum data representative of the resultant sum;

converting the total sum data to a corresponding document element data in accordance with the fourth descriptor record; and outputting writings of the document element of the total sum so as to be filled in the total sum field specified by the fourth descriptor record in the output document.

6. The method of claim 1, wherein the entered first written signs comprise descriptor-dedicated written signs that serve as dedicated descriptor elements to constitute a descriptor.

7. The method of claim 6, wherein the descriptor-dedicated written signs have attributes distinct from those of ordinary written-information representative of contents of the source document.

8. An apparatus for information processing, said apparatus comprising:

a first entering device operable to enter first written signs in the form of characters, symbols, and/or graphicals additionally written in a source document such that an attribute of the first written signs is distinct from that of an ordinary writing in the source document, the entered first written signs specifying a data item name and a field with a desired field attribute and a desired field format at a desired location in predetermined rules so that the combination of the data item name and the field defines a first descriptor indicating that one or more data values of the data item are to be filled in the field with the desired field attribute and the desired field format;

wherein the source document is unrestricted by rules applicable to the entered first written signs;

wherein the first written signs comprise a first descriptor element for designating, as the data item name, a character or character string that is originally written to be literally representative of the data item as an ordinary writing in the source document; and wherein the first written signs comprise another descriptor element having its written position indicating a location or boundary of the field in the source documents;

a first recognizing device operable to recognize the first descriptor on a basis of the entered first written signs to produce a corresponding first descriptor record;

a device operable to fetch a data record containing a data value of the data item name from a source data file;

a first converting device operable to convert the data value of the data item name in the data record to a corresponding document element data in accordance with the first descriptor record; and a first outputting device operable to output writings of the document element so as to be filled in the field specified by the first descriptor record in the output document.

9. The apparatus of claim 8, further comprising:

a second entering device operable to enter second written signs in the form of characters, symbols, and/or graphicals additionally written in a source document, the entered second written signs specifying a unit relating to the field in predetermined rules so that a combination of the unit and the field defines a second descriptor associated with the first descriptor, the second descriptor indicating that one or more numerical data values of the data item to be filled in the field of the data item name are to be expressed in the unit;

wherein the second written signs comprise a second descriptor element for designating, as the unit name, a character, character string, or symbol literally representative of the unit as an ordinary writing for requesting searching in a dictionary for the unit name registered to specify the descriptor content;

a second recognizing device operable to recognize the second descriptor on the basis of the entered second written signs to produce a corresponding second descriptor record combined with the first descriptor record; and a second converting device operable to convert the unit of the data item name in the data record to the unit specified by the second descriptor record.

10. The apparatus of claim 9, wherein said entering device comprises a second input device operable to enter the written signs from a display screen.

11. The apparatus of claim 10, wherein said first recognizing device comprises a device operable to create a document file corresponding to written signs entered by said second input device.

12. The apparatus of claim 8, further comprising:

a third entering device operable to enter third written signs in the form of characters, symbols, and/or graphicals additionally written in a source document, the entered third written signs specifying an arithmetic formula including the data item name as an operand in predetermined rules so that the arithmetic formula is qualified as a third descriptor indicating that an arithmetic operation is to be performed in accordance with the arithmetic formula;

wherein the third written signs include the same pattern of written signs to designate the data item name in the arithmetic formula as the first descriptor element of the first written signs;

a third recognizing device operable to recognize the third descriptor on a basis of the entered written signs to produce a corresponding third descriptor record;

an operating device operable to carry out the arithmetic operation for the data value of the data item name in the data record to produce data of the computed result in accordance with the third descriptor record;

a third converting device operable to convert the data of the computed result to a corresponding document element; and a third outputting device operable to output writings of the document element so as to be filled in the field of the corresponding data item name specified by the first descriptor record in the output document.

13. The apparatus of claim 8, wherein said entering device employs a common entering system operable to enter ordinary written-information on document contents and the first written-signs for descriptors.

14. The apparatus of claim 8, wherein said entering device comprises a first input device operable to enter the written signs by an image.

15. The apparatus of claim 14, wherein said first recognizing device comprises a device operable to recognize, from the image entered by said first input device, characters and graphicals of the written signs to thereby create a document file corresponding to the written signs.

16. The apparatus of claim 14, wherein said first recognizing device comprises a device operable to recognize, from the image entered by said first input device, characters and graphicals of the written signs only, including all descriptor-dedicated written signs and ordinary written information associated therewith, to thereby create a document element file corresponding to the written signs.

17. The apparatus of claim 8, wherein said first recognizing device comprises a descriptor-dedicated written signs recognizing device operable to recognize, from the written signs entered by said entering device, descriptor-dedicated written signs from their attributes.

18. The apparatus of claim 17, wherein said descriptor-dedicated written signs recognizing device comprises a device operable to identity a color attribute of the written signs.

19. The apparatus of claim 17, wherein said descriptor-dedicated written signs recognizing device comprises a device operable to determine whether the written signs are hand-written or printed.

20. The apparatus of claim 17, wherein said descriptor-dedicated written signs recognizing device comprises a device operable to identify a line width attribute of the written signs.

21. The apparatus of claim 17, wherein said descriptor-dedicated written signs recognizing device comprises a device operable to identify a line type attribute of the written signs.

22. A computer-readable medium encoded with a computer program for performing data managing with a document, said computer readable medium comprising:

computer readable program code operable to allow entry of first written signs in the form of characters, symbols, and/or graphicals additionally written in a source document such that an attribute of the first written signs is distinct from that of an ordinary writing in the source document, the entered first written signs specifying a data item name and a field with a desired field attribute and a desired field format at a desired location in predetermined rules so that a combination of the data item name and the field defines a first descriptor indicating that one or more data values of the data item are to be filled in the field with the desired field attribute and the desired field format;

wherein the source document is unrestricted by rules applicable to the entered first written signs;

wherein the first written signs comprise a first descriptor element for designating, as the data item name, a character or character string that is originally written to be literally representative of the data item as an ordinary writing in the source document; and wherein the first written signs comprise another descriptor element having its written position indicating a location or boundary of the field in the source document;

computer readable code operable to allow recognition of the first descriptor on a basis of the entered first written signs to produce a corresponding first descriptor record;

computer readable code operable to allow fetching of a data record containing data value of the data item name from a source data file;

computer readable code operable to allow a conversion of the data value of the data item name in the data record to a corresponding document element in accordance with the first descriptor record; and computer readable code operable to allow an output of writings of the document element so as to be filled in the field specified by the first descriptor record in the output document.

23. The computer-readable medium of claim 22, further comprising:

computer readable code operable to allow entry of second written signs in the form of characters, symbols, and/or graphicals additionally written in a source document, the entered second written signs specifying a unit relating to the field in predetermined rules so that a combination of the unit and the field defines a second descriptor associated with the first descriptor, the second descriptor indicating that one or more numerical data values of the data item to be filled in the field of the data item name are to be expressed in the unit;

wherein the second written signs comprise a second descriptor element for designating, as the unit name, a character, character string, or symbol literally representative of the unit as an ordinary writing and for requesting searching in a dictionary for the unit name registered to specify the descriptor content;

computer readable code operable to allow recognition of the second descriptor on a basis of the entered second written signs to produce a corresponding second descriptor record combined with the first descriptor record; and computer readable code operable to allow conversion of the unit of the data item name in the data record to the unit specified by the second descriptor record.

24. The computer-readable medium of claim 22, further comprising:

computer readable code operable to allow entry of third written signs in the form of characters, symbols, and/or graphicals additionally written in a source document, the entered third written signs specifying an arithmetic formula including the data item name as an operand and one or more operators in predetermined rules so that the arithmetic formula is qualified as a third descriptor indicating that an arithmetic operation is to be performed in accordance with the arithmetic formula;

wherein the third written signs include the same pattern of written signs to designate the data item name in the arithmetic formula as the first descriptor element of the first written signs;

computer readable code operable to allow recognition of the third descriptor on a basis of the entered third written signs to produce a corresponding third descriptor record;

computer readable code operable to perform the arithmetic operation for a data value of the data item name in the data record to produce data of the computed result in accordance with the third descriptor record;

computer readable code operable to allow conversion of the data of the computed result to a corresponding document element; and computer readable code operable to allow output of the writings of the document element so as to be filled in the field of the corresponding data item name specified by the first descriptor record in the output document.

25. The computer-readable medium of claim 22, wherein the field includes a plurality of tubular cells arranged in a line in each of which a numerical data of the data item name per one data record is to be filled.

26. The computer-readable medium of claim 25, further comprising:

computer readable code operable to allow entry of fourth written signs in the form of characters, symbols, and/or graphicals additionally written in a source document, the entered fourth written signs specifying a total sum and a total sum field related to the field of the data item name in predetermined rules so that a combination of the total sum and total sum field defines a fourth descriptor associated with the first descriptor, the fourth descriptor indicating that numerical data values of the data item to be filled in the field of the data item name are to be summed and the resultant sum data is to be filled in the total sum field;

wherein the fourth written signs comprise a fourth descriptor element for designating, as the total sum name constituting the fourth descriptor, a character, character string, or symbol literally representative of the total sum as an ordinary writing and for requesting searching in a dictionary for the total sum name registered to specify the descriptor content;

computer readable code operable to allow recognition of the fourth descriptor on the basis of the entered fourth written signs to produce a corresponding fourth descriptor record combined with the first descriptor record;

computer readable code operable to allow a summing up of data values of the data item name in data records to obtain a total sum data representative of the resultant sum;

computer readable code operable to allow conversion of the total sum data to a corresponding document element data in accordance with the fourth descriptor record; and computer readable code operable to allow output of writings of the document element of the total sum so as to be filled in the total sum field specified by the fourth descriptor record in the output document.

27. The computer-readable medium of claim 22, wherein the entered first written signs comprise descriptor-dedicated written signs that serve as dedicated descriptor elements to constitute a descriptor.

28. The computer-readable medium of claim 27, wherein the descriptor-dedicated written signs have attributes distinct from those of ordinary written-information representative of contents of the source document.

* * * * *